(12) United States Patent
Konieczny

(10) Patent No.: US 11,687,775 B2
(45) Date of Patent: Jun. 27, 2023

(54) NEURAL NETWORK DATA PROCESSING APPARATUS AND METHOD

(71) Applicant: HUAWEI TECHNOLOGIES CO., LTD., Guangdong (CN)

(72) Inventor: Jacek Konieczny, Munich (DE)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 875 days.

(21) Appl. No.: 16/579,665

(22) Filed: Sep. 23, 2019

(65) Prior Publication Data

US 2020/0019860 A1    Jan. 16, 2020

Related U.S. Application Data

(63) Continuation of application No. PCT/EP2017/057089, filed on Mar. 24, 2017.

(51) Int. Cl.
| | |
|---|---|
| *G06E 1/00* | (2006.01) |
| *G06N 3/08* | (2023.01) |
| *G06N 3/04* | (2023.01) |

(52) U.S. Cl.
CPC ............... *G06N 3/08* (2013.01); *G06N 3/04* (2013.01)

(58) Field of Classification Search
CPC .......... G16H 30/40; G06N 3/08; G06N 20/00; G06T 7/0014; G06T 7/143; G06T 2207/20076; G06T 2207/20081; G06T 2207/20084; G06T 2207/30101; G06T 2200/04; G06T 2207/10081; G06T 2207/10088; G06T 2207/10116; G06T 2207/30016; G06T 7/62; G06T 7/0016
See application file for complete search history.

(56) References Cited

U.S. PATENT DOCUMENTS

2018/0165577 A1* 6/2018 Young .................. G06N 3/0454
2018/0189642 A1* 7/2018 Boesch .................. G06F 30/34

OTHER PUBLICATIONS

Riegler Gernotet al, "Conditioned Regression Models for Non-blind Single Image Super-Resolution", 2015 IEEE International Conference on Computer Vision (ICCV), IEEE,Dec. 7, 2015 (Dec. 7, 2015), p. 522-530, XP032866372.
Di Kang et al, "Crowd Counting by Adapting Convolutional Neural Networks with Side Information", arxiv.org, Cornell University Library, 201 Olin Library Cornell University Ithaca, NY 14853,Nov. 21, 2016 (Nov. 21, 2016), XP080732861.
Kan Chen et al, "ABC-CNN: An Attention Based Convolutional Neural Network for Visual Question Answering", Nov. 18, 2015 (Nov. 18, 2015), XP055368215.

(Continued)

*Primary Examiner* — Xin Jia
(74) *Attorney, Agent, or Firm* — Womble Bond Dickinson (US) LLP

(57) ABSTRACT

Embodiments of the invention relates to a data processing apparatus comprising a processor configured to provide a neural network, wherein the neural network comprises a neural network layer being configured to generate from an array of input data values an array of output data values based on a plurality of position dependent kernels and a plurality of input data values of the array of input data values. Moreover, embodiments of the invention relates to a corresponding data processing method.

21 Claims, 11 Drawing Sheets

(56) References Cited

OTHER PUBLICATIONS

Jampani Varun et al., "Learning Sparse High Dimensional Filters: Image Filtering, Dense CRFs and Bilateral Neural Networks", 2016 IEEE Conference on Computer Vision and Pattern Recognition (CVPR), IEEE,Jun. 27, 2016 (Jun. 27, 2016), p. 4452-4461, XP033021632.
Yukai Shi et al, ""Local- and Holistic-Structure Preserving Image Super Resolution via Deep Joint Component Learning""", arxiv.org, Cornell University Library, 201 Olin Library Cornell University Ithaca, NY 14853,Jul. 25, 2016 (Jul. 25, 2016),XP080714643.
Mexey Dosovitskiy et al, "Learning to Generate Chairs, Tables and Cars with Convolutional Networks", Dec. 3, 2015 (Dec. 3, 2015), XP055434648.
Li Yijun et al., "Deep Joint Image Filtering", Sep. 17, 2016 (Sep. 17, 2016), Network and Parallel Computing; [Lecture Notes in Computer Science; Lect.Notes Computer], Springer International Publishing, Cham, pp. 154-169,XP047355387.
Kaiming He et al., "Guided Image Filtering", ECCV 2010. total 14 pages.
J. Long et al. Fully Convolutional Networks for Semantic Segmentation, CVPR 2015, total 10 pages.
Vijay Badrinarayanan et al. "SegNet: A Deep Convolutional Encoder-Decoder Architecture for Image Segmentation", Oct. 2016. total 14 pages.
M. Elad, "On the origin of bilateral filter and ways to improve it", IEEE Transactions on Image Processing, vol. 11, No. 10, pp. 1141-1151, Oct. 2002.
Philipp Fischer, et al.,:"FlowNet: Learning Optical Flow with Convolutional Networks", May 2015. total 13 pages.
Bert De Brabandere et al: "Dynamic Filter Networks",, May 31, 2016 (May 31, 2016), XP055711953,9 pages.
Liang-Chieh Chen et al: "DeepLab: Semantic Image Segmentation with Deep Convolutional Nets, Atrous Convolution, and Fully Connected CRFs",Jun. 2, 2016, 14 pages.

\* cited by examiner

NEURAL NETWORK DATA PROCESSING APPARATUS AND METHOD

CROSS-REFERENCE TO RELATED APPLICATIONS

This application is a continuation of International Application No. PCT/EP2017/057089, filed on Mar. 24, 2017, the disclosure of which is hereby incorporated by reference in its entirety.

TECHNICAL FIELD

Generally, embodiments of the invention relate to the field of machine learning or deep learning based on neural networks. Embodiments of the invention relate to a neural network data processing apparatus and method, in particular for processing data in the fields of audio processing, computer vision, image or video processing, classification, detection and/or recognition.

BACKGROUND

Guided up-scaling, which is commonly used in many signal processing applications, including especially image up-scaling methods for image quality improvement, super-resolution and many others [Kaiming He, Jian Sun, Xiaoou Tang, "Guided Image Filtering", ECCV 2010], is a process in which input data is being combined with additional input in form of up-scaling weights that control the influence of each input data value on the result to form the output data.

In deep-learning, a common approach recently used in many application fields is the utilization of convolutional neural networks (CNNs). Generally, a part of such convolutional neural networks is at least one convolution (or convolutional) layer which performs a convolution of input data values with a learned kernel K producing one output data value per convolution kernel for each output position [J. Long, E. Shelhamer, T. Darrell, "Fully Convolutional Networks for Semantic Segmentation", CVPR 2015]. For the two-dimensional case used, for instance, in image processing the convolution using the learned kernel K can be expressed mathematically as follows:

$$\text{out}(x,y) = \Sigma_{i=-r}^{r} \Sigma_{j=-r}^{r} \text{in}(x-i, y-j) \cdot K(i,j) [+B],$$

wherein out (x,y) denotes the array of output data values, in (x−i,y−j) denotes a sub-array of input data values and K(i,j) denotes the kernel comprising an array of kernel weights or kernel values of size (2r+1)×(2r+1). B denotes a learned bias term, which can be added for obtaining each output data value. The weights of the kernel K are the same for the whole array of input data values in(x,y) and are generally learned during a learning phase of the neural network which, in case of 1st order methods, consists of iteratively back-propagating the gradients of the neural network output back to the input layers and updating the weights of all the network layers by a partial derivative computed in this way. An extension of CNNs are deconvolutional neural networks (DNNs) with an element that extends their functionality relative to CNNs that is called deconvolution. Deconvolution can be interpreted as an "inversed" convolution known from classical CNNs.

SUMMARY

It is an object of the invention to provide an improved data processing apparatus and method based on neural networks.

The foregoing and other objects are achieved by the subject matter of the independent claims. Further embodiments are apparent from the dependent claims, the description and the figures.

Generally, embodiments of the invention provide a new approach for deconvolution or upscaling of data for neural networks that is implemented into a neural network as a new type of neural network layer. The neural network layer can compute up-scaled data using individual up-scaling weights that are learned for each individual spatial position. Up-scaling weights can be computed as a function of position dependent weights or similarity features and position independent learned weight kernels, resulting in individual up-scaling weights for each input spatial position. In this way a variety of sophisticated position dependent or position adaptive kernels learned by the neural network can be utilized for better adaptation of the up-scaling weights to the input data.

, A first aspect of the invention relates to a data processing apparatus comprising one or more processors configured to provide a neural network. The data to be processed by the data processing apparatus can be, for instance, two-dimensional image or video data or one-dimensional audio data.

The neural network provided by the one or more processors of the data processing apparatus comprises a neural network layer being configured to process an array of input data values, such as a two-dimensional array of input data values in(x,y), into an array of output data values, such as a two-dimensional array of output data values out (x,y). The neural network layer can be a first layer or an intermediate layer of the neural network.

The array of input data values can be one-dimensional (i.e. a vector, e.g. audio or other e.g. temporal sequence), two-dimensional (i.e. a matrix, e.g. an image or other temporal or spatial sequence), or N-dimensional (e.g. any kind of N-dimensional feature array, e.g. provided by a conventional pre-processing or feature extraction and/or by other layers of the neural network).

The array of input data values can have one or more channels, e.g. for an RGB image one R-channel, one G-channel and one B-channel, or for a black/white image only one grey-scale or intensity channel. The term "channel" can refer to any "feature", e.g. features obtained from conventional pre-processing or feature extraction or from other neural networks or neural network layers of the same neural network. The array of input data values can comprise, for instance, two-dimensional RGB or grey scale image or video data representing at least a part of an image, or a one-dimensional audio signal. In case the neural network layer is implemented as an intermediate layer of the neural network, the array of input data values can be, for instance, an array of similarity features generated by previous layers of the neural network on the basis of an initial, i.e. original array of input data values, e.g. by means of a feature extraction.

The neural network layer is configured to generate from the array of input data values the array of output data values on the basis of a plurality of position dependent, i.e. spatially variable kernels and a plurality of different input data values of the array of input data values. Each kernel comprises a plurality of kernel values (also referred to as kernel weights). For a respective position or element of the array of input data values a respective kernel is applied thereto for generating a respective sub-array of the array of output data values. In one embodiment, the plurality of kernel values of a respective position dependent kernel can be respectively multiplied with a respective input data value for generating a respective sub-array of the array of output data values having the same size as the position dependent kernel, i.e. the array of kernel values. Generally, the size of the array of input data values can be smaller than the size of the array of output data values.

A "position dependent kernel" as used herein means a kernel whose kernel values can depend on the respective position or element of the array of input data values. In other words, for a first kernel used for a first input data value of the array of input data values the kernel values can differ from the kernel values of a second kernel used for a second input data value of the array of input data values. In a two-dimensional array the position could be a spatial position defined, for instance, by two spatial coordinates x, y. In a one-dimensional array the position could be a temporal position defined, for instance, by a time coordinate t.

Thus, an improved data processing apparatus based on neural networks is provided. The data processing apparatus allows upscaling or deconvolving the input data in a way that can better reflect mutual data similarity. Moreover, the data processing apparatus allows adapting the kernel weights for different spatial positions of the array of input data values. This, in turn, allows, for instance, minimizing the influence of some of the input data values on the result, for instance the input data values that are associated with another part of the scene (as determined by semantic segmentation) or a different object that is being analysed.

In a further embodiment of the first aspect, the neural network comprises at least one additional network layer configured to generate the plurality of position dependent kernels on the basis of an original array of original input values of the neural network, wherein the original array of original input values of the neural network comprises the array of input values or another array of input values associated to the array of input values. The original array of original input values can be the array of input data values or a different array.

In a further embodiment of the first aspect, the neural network is configured to generate the plurality of position dependent kernels based on a plurality of learned position independent kernels and a plurality of position dependent weights (also referred to as similarity features). Generally, the position independent kernels can be learned by the neural network and the position dependent weights (i.e. similarity features) can be computed, for instance, by a further preceding layer of the neural network. This embodiment allows minimizing the amount of data being transferred to the neural network layer in order to obtain the kernel values. This is because the kernel values are not transferred directly, but computed from the plurality of position dependent weights (i.e. similarity features) substantially reducing the amount of data for each element of the array of output data values. This can minimize the amount of data being stored and transferred by the neural network between the different network layers, which is especially important during the learning process on the basis of the mini-batch approach as the memory of the data processing apparatus (GPU) is currently the main bottleneck. Moreover, this embodiment allows for a better adaption of the kernel values to the processed data and utilizing more sophisticated similarity features. For instance, information about object shapes or object segmentations can be utilized in order to better preserve better object boundaries or even increase the level of details in the higher-resolution output. In this way, information about some small details from the original array of original input values not present in the possibly low-resolution array of input data values can be combined with the array of input data values in order to create higher-resolution array of output data values.

In a further embodiment of the first aspect, the neural network is configured to generate a kernel of the plurality of position dependent kernels by adding the learned position independent kernels each weighted by the associated non-learned position dependent weights (i.e. similarity features). This embodiment provides a very efficient representation of the plurality of position dependent kernels using a linear combination of position independent "base kernels".

In a further embodiment of the first aspect, the plurality of position independent kernels are predetermined or learned, and wherein the neural network comprises at least one additional neural network layer or "conventional" pre-processing layer configured to generate the plurality of position dependent weights (i.e. similarity features) based on an original array of original input values of the neural network, wherein the original array of original input values of the neural network comprises the array of input values or another array of input values associated to the array of input values. The original array of original input values can be the array of input data values or a different array. In an embodiment, the at least one additional neural network layer or "conventional" pre-processing layer can generate the plurality of position dependent weights (i.e. similarity features) using, for instance, bilateral filtering, semantic segmentation, per-instance object detection, and data importance indicators like ROI (region of interest).

In a further embodiment of the first aspect, the array of input data values and the array of output data values are two-dimensional arrays, and the convolutional neural network layer is configured to generate the plurality of position dependent kernels $w_L(x,y,i,j)$ on the basis of the following equation:

$$w_L(x,y,i,j)=\sum_{f=1}^{N_f} F_f(x,y) \cdot K_f(i,j),$$

wherein $F_f(x,y)$ denotes the plurality of $N_f$ position dependent weights (i.e. similarity features) and $K_f(i,j)$ denotes the plurality of position independent "base" kernels.

In a further embodiment of the first aspect, the neural network layer is a deconvolutional network layer or an upscaling network layer.

In a further embodiment of the first aspect, the array of input data values and the array of output data values are two-dimensional arrays, wherein the neural network layer is a deconvolution network layer configured to generate the array of output data values on the basis of the following equations:

$$\text{out}(x, y, c_o) = \frac{1}{W_{L'}(x, y, c_o)} \sum_{c_i=1}^{C_i} \sum_{\{x',y'\}:x'-i=x,y'-j=y} \text{in}(x', y', c_i) w_L(x', y', c_o, c_i, i, j),$$

$$W'_L(x, y, c_o) = \sum_{c_i=1}^{C_i} \sum_{\{x',y'\}:x'-i=x,y'-j=y} w_L(x', y', c_o, c_i, i, j),$$

$$i \in \{-r, ..., r\}, j \in \{-r, ..., r\},$$

wherein x,y,x',y',i,j denote array indices, out(x,y,$c_o$) denotes the multi-channel array of output data values, in(x', y',$c_i$) denotes the array of input data values, r denotes a size of each kernel of the plurality of position dependent multi-channel kernels $w_L(x',y',c_o,c_i,i,j)$ and $W_L'(x,y,c_o)$ denotes a normalization factor. In an embodiment, the normalization factor $W_L'(x,y,c_o)$ can be set equal to 1.

In a further embodiment of the first aspect, the array of input data values and the array of output data values are two-dimensional arrays, wherein the neural network layer is an upscaling network layer configured to generate the array of output data values on the basis of the following equations:

$$\text{out}(x, y,) = \frac{1}{W_{L'}(x, y)} \sum_{\{x',y'\}:x'-i=x,y'-j=y} \text{in}(x', y', c_i) w_L(x', y', i, j),$$

$$W_L'(x, y) = \sum_{\{x',y'\}:x'-i=x,y'-j=y} w_L(x', y', i, j), i \in \{-r, \ldots, r\}, j \in \{-r, \ldots, r\},$$

wherein x,y,x',y',i,j denote array indices, out(x,y) denotes the array of output data values, in(x',y') denotes the array of input data values, r denotes a size of each kernel of the plurality of position dependent kernels $w_L(x',y',i,j)$ and $W_L'(x,y)$ denotes a normalization factor. In an embodiment, the normalization factor $W_L'(x,y)$ can be set equal to 1. As will be appreciated, the sum in the equation above extends over every possible position (x',y') of the array of input data values, where x' and y' meet the conditions: x'−i=x and y'−j=y. In this way, overlapping positions of different position dependent kernels are obtained that are summed to generate the final output data value out(x,y).

In a further embodiment of the first aspect, the array of input data values and the array of output data values are two-dimensional arrays and the neural network layer is configured to generate the array of output data values on the basis of the following equations:

$$\text{out}(x, y,) = \frac{1}{W_{L'}(x, y)} \sum_{\{x',y'\}:x'-i=x,y'-j=y} \text{in}(x', y') \text{sel}(x', y', i, j),$$

$$W_L'(x, y) = \sum_{\{x',y'\}:x'-i=x,y'-j=y} \text{sel}(x', y', i, j), i \in \{-r, \ldots, r\}, j \in \{-r, \ldots, r\},$$

$$\text{sel}(x, y, i, j) = \begin{cases} 1, & w_L(x, y, i, j) \text{ is max or min weight of all} \\ & w_L(x, y, k, l), k \in \{-r, \ldots, r\}, l \in \{r, \ldots, r\} \\ 0, & \text{otherwise} \end{cases}$$

wherein x,y,x',y'i,j,k,l denote array indices, out(x,y) denotes the array of output data values, in(x',y') denotes the array of input data values, r denotes a size of each kernel of the plurality of position dependent kernels $w_L(x,y,i,j)$, sel(x,y,i,j) denotes a selection function and $W_L'(x,y)$ denotes a normalization factor. In an embodiment, the normalization factor $W_L'(x,y)$ can be set equal to 1.

In a further embodiment of the first aspect, the array of input data values and the array of output data values are two-dimensional arrays and the neural network layer is configured to generate the array of output data values on the basis of the following equations:

$$\text{out}(x, y,) = \frac{1}{W_{L'}(x, y)} \sum_{\{x',y'\}:x'-i=x,y'-j=y} \text{in}(x', y') \text{sel}(x, y, x', y', i, j),$$

$$W_L'(x, y) = \sum_{\{x',y'\}:x'-i=x,y'-j=y} \text{sel}(x, y, x', y', i, j),$$

$$i \in \{-r, \ldots, r\}, j \in \{-r, \ldots, r\},$$

$$\text{sel}(x, y, x', y', i, j) = \begin{cases} 1, & w_L(x', y', i, j) \text{ is maximum weight of} \\ & \text{all } w_L(x'', y'', k, l), \{x'', y''\}:x''- \\ & k \in \{-r, \ldots, r\}, l \in \{r, \ldots, r\} \\ 0, & \text{otherwise} \end{cases}$$

wherein x,y,x',y',x'',y'',i,j,k,l denote array indices, out(x,y) denotes the array of output data values, in(x',y') denotes the array of input data values, r denotes a size of each kernel of the plurality of position dependent kernels $w_L(x',y',i,j)$, sel (x,y,x',y',i,j) denotes a selection function and $W_L'(x,y)$ denotes a normalization factor. In an embodiment, the normalization factor $W_L'(x,y)$ can be set equal to 1.

According to a second aspect, the invention relates to a corresponding data processing method comprising the operation of generating by a neural network layer of a neural network from an array of input data values an array of output data values based on a plurality of position dependent kernels and a plurality of different input data values of the array of input data values.

In a further embodiment of the second aspect, the method comprises the further operation of generating the plurality of position dependent kernels by an additional neural network layer of the neural network based on an original array of original input values of the neural network, wherein the original array of original input values of the neural network comprises the array of input values or another array of input values associated to the array of input values.

In a further embodiment of the second aspect, the operation of generating the plurality of position dependent kernels comprises generating the plurality of position dependent kernels based on a plurality of position independent kernels and a plurality of position dependent weights.

In a further embodiment of the second aspect, the operation of generating the plurality of position dependent kernels comprises the operation of adding, i.e. summing the position independent kernels weighted by the associated position dependent weights.

In a further embodiment of the second aspect, the plurality of position independent kernels are predetermined or learned and the operation of generating the plurality of position dependent weights comprises the operation of generating the plurality of position dependent weights by an additional neural network layer or a processing layer of the neural network based on an original array of original input values of the neural network, wherein the original array of original input values of the neural network comprises the array of input values or another array of input values associated to the array of input values.

In a further embodiment of the second aspect, the array of input data values and the array of output data values are two-dimensional arrays, and the operation of generating a kernel of the plurality of position dependent kernels $w_L(x,y,i,j)$ is based on the following equation:

$$w_L(x,y,i,j) = \sum_{f=1}^{N_f} F_f(x,y) \cdot K_f(i,j),$$

wherein $F_f(x,y)$ denotes the plurality of $N_f$ position dependent weights (i.e. similarity features) and $K_f(i,j)$ denotes the plurality of position independent kernels.

In a further embodiment of the second aspect, the neural network layer is a deconvolutional network layer or an upscaling network layer.

In a further embodiment of the second aspect, the array of input data values and the array of output data values are two-dimensional arrays, wherein the neural network layer is a deconvolution network layer and the operation of generating the array of output data values comprises generating the array of output data values on the basis of the following equations:

$$\text{out}(x, y, c_o) = \frac{1}{W_{L'}(x, y, c_o)} \sum_{c_i=1}^{C_i} \sum_{\{x',y'\}: x'-i=x, y'-j=y} \text{in}(x', y', c_i) w_L(x', y', c_o, c_i, i, j),$$

$$W'_L(x, y, c_o) = \sum_{c_i=1}^{C_i} \sum_{\{x',y'\}: x'-i=x, y'-j=y} w_L(x', y', c_o, c_i, i, j),$$

$$i \in \{-r, ..., r\}, j \in \{-r, ..., r\},$$

wherein x,y,x',y',i,j denote array indices, out(x,y,$c_o$) denotes the multi-channel array of output data values, in(x', y',$c_i$) denotes the array of input data values, r denotes a size of each kernel of the plurality of position dependent multi-channel kernels $w_L$(x',y',$c_o$,$c_i$,i,j) and $W_L$'(x,y,$c_o$) denotes a normalization factor. In one embodiment, the normalization factor $W_L$'(x,y,$c_o$) can be set equal to 1.

In a further embodiment of the second aspect, the array of input data values and the array of output data values are two-dimensional arrays, wherein the neural network layer is an upscaling network layer and the operation of generating the array of output data values comprises generating the array of output data values on the basis of the following equations:

$$\text{out}(x, y,) = \frac{1}{W_{L'}(x, y)} \sum_{\{x',y'\}: x'-i=x, y'-j=y} \text{in}(x', y') w_L(x', y', i, j),$$

$$W'_L(x, y) = \sum_{i=r}^{r} \sum_{j=-r}^{r} w_L(x', y', i, j),$$

$$\{x' y'\}: x' - i = x, y' - j = y, i \in \{-r, ..., r\}, j \in \{-r, ..., r\},$$

wherein x,y,x',y',i,j denote array indices, out(x,y) denotes the array of output data values, in(x',y') denotes the array of input data values, r denotes a size of each kernel of the plurality of position dependent kernels $w_L$(x',y',i,j) and $W_L$'(x,y) denotes a normalization factor. In an embodiment the normalization factor $W_L$'(x,y) can be set equal to 1.

In a further embodiment of the second aspect, the array of input data values and the array of output data values are two-dimensional arrays and the operation of generating the array of output data values comprises generating the array of output data values on the basis of the following equations:

$$\text{out}(x, y,) = \frac{1}{W_{L'}(x, y)} \sum_{\{x',y'\}: x'-i=x, y'-j=y} \text{in}(x', y') \text{sel}(x', y', i, j),$$

$$W'_L(x, y) = \sum_{\{x',y'\}: x'-i=x, y'-j=y} \text{sel}(x', y', i, j), i \in \{-r, ..., r\}, j \in \{-r, ..., r\},$$

$$\text{sel}(x, y, i, j) = \begin{cases} 1, & w_L(x, y, i, j) \text{ is max or min weight of all} \\ & w_L(x, y, k, l), k \in \{-r, ..., r\}, l \in \{r, ..., r\} \\ 0, & \text{otherwise} \end{cases}$$

wherein x,y,x',y',i,j,k,l denote array indices, out(x,y) denotes the array of output data values, in(x',y') denotes the array of input data values, r denotes a size of each kernel of the plurality of position dependent kernels $w_L$(x,y,i,j), sel(x, y,i,j) denotes a selection function and $W_L$'(x,y) denotes a normalization factor. In an embodiment the normalization factor $W_L$'(x,y) can be set equal to 1.

In a further embodiment of the second aspect, the array of input data values and the array of output data values are two-dimensional arrays and the operation of generating the array of output data values comprises generating the array of output data values on the basis of the following equations:

$$\text{out}(x, y,) = \frac{1}{W_{L'}(x, y)} \sum_{\{x',y'\}: x'-i=x, y'-j=y} \text{in}(x', y') \text{sel}(x, y, x', y', i, j),$$

$$W'_L(x, y) = \sum_{\{x',y'\}: x'-i=x, y'-j=y} \text{sel}(x, y, x', y', i, j),$$

$$i \in \{-r, ..., r\}, j \in \{-r, ..., r\},$$

$$\text{sel}(x, y, x', y', i, j) = \begin{cases} 1 & w_L(x', y', i, j) \text{ is maximum weight of} \\ & \text{all } w_L(x'', y'', k, l), \{x'', y''\}: x'' - \\ & k = x, y'' - l = y, \\ & k \in \{-r, ..., r\}, l \in \{r, ..., r\} \\ 0, & \text{otherwise} \end{cases}$$

wherein x,y,x', y',x",y",i,j,k,l denote array indices, out(x, y) denotes the array of output data values, in(x',y') denotes the array of input data values, r denotes a size of each kernel of the plurality of position dependent kernels $w_L$(x',y',i,j), sel(x,y,x',y',i,j) denotes a selection function and $W_L$'(x,y) denotes a normalization factor. In an embodiment the normalization factor $W_L$'(x,y) can be set equal to 1.

According to a third aspect the invention relates to a computer program comprising program code for performing the method according to the second aspect, when executed on a processor or a computer.

The invention can be implemented in hardware and/or software.

BRIEF DESCRIPTION OF THE DRAWINGS

Further embodiments of the invention will be described with respect to the following figures, wherein.

In the various figures, identical reference signs will be used for identical or at least functionally equivalent features.

DETAILED DESCRIPTION OF EMBODIMENTS

In the following description, reference is made to the accompanying drawings, which form part of the disclosure, and in which are shown, by way of illustration, aspects in which the embodiments of the invention may be placed. It is understood that other aspects may be utilized and structural or logical changes may be made without departing from the scope of the embodiments of the invention. The following detailed description, therefore, is not to be taken in a limiting sense, as the scope of the embodiments of the invention is defined by the appended claims.

For instance, it is understood that a disclosure in connection with a described method may also hold true for a corresponding device or system configured to perform the method and vice versa. For example, if a method operation is described, a corresponding device may include a unit to perform the described method operation, even if such unit is not explicitly described or illustrated in the figures. Further, it is understood that the features of the various exemplary aspects described herein may be combined with each other, unless noted otherwise.

Figure 1:
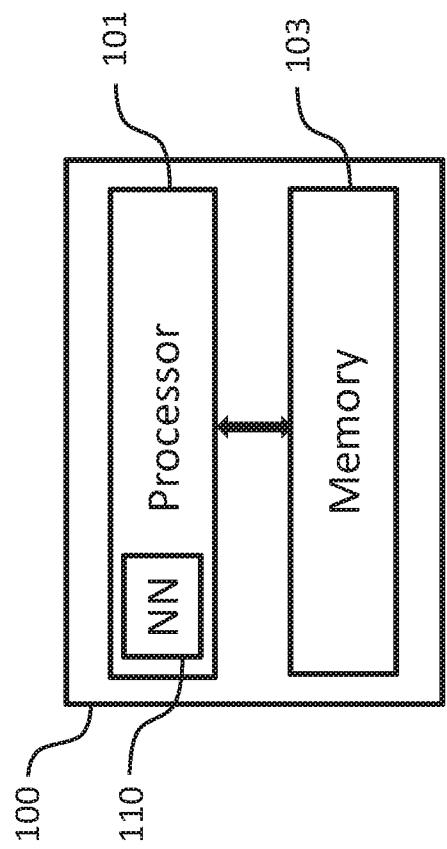
FIG. 1 shows a schematic diagram illustrating a data processing apparatus based on a neural network according to an embodiment.

FIG. 1 shows a schematic diagram illustrating a data processing apparatus 100 according to an embodiment configured to process data on the basis of a neural network. To this end, the data processing apparatus 100 shown in FIG. 1 comprises a processor 101. In an embodiment, the data processing apparatus 100 can be implemented as a distributed data processing apparatus 100 comprising more than the one processor 101 shown in FIG. 1.

The processor 101 of the data processing apparatus 100 is configured to provide a neural network 110. As will be described in more detail further below, the neural network 110 comprises a neural network layer being configured to generate from an array of input data values an array of output data values based on a plurality of position dependent kernels and a plurality of different input data values of the array of input data values. As shown in FIG. 1, the data processing apparatus 100 can further comprise a memory 103 for storing and/or retrieving the input data values, the output data values and/or the kernels.

Each kernel comprises a plurality of kernel values (also referred to as kernel weights). For a respective position or element of the array of input data values a respective kernel is applied thereto for generating a respective sub-array of the array of output data values. Generally, the size of the array of input data values is smaller than the size of the array of output data values. A "position dependent kernel" as used herein means a kernel whose kernel values depend on the respective position or element of the array of input data values. In other words, for a first kernel used for a first input data value of the array of input data values the kernel values can differ from the kernel values of a second kernel used for a second input data value of the array of input data values. In a two-dimensional array the position could be a spatial position defined, for instance, by two spatial coordinates x, y. In a one-dimensional array the position could be a temporal position defined, for instance, by a time coordinate t.

The array of input data values can be one-dimensional (i.e. a vector, e.g. audio or other e.g. temporal sequence), two-dimensional (i.e. a matrix, e.g. an image or other temporal or spatial sequence), or N-dimensional (e.g. any kind of N-dimensional feature array, e.g. provided by a conventional pre-processing or feature extraction and/or by other layers of the neural network 110). The array of input data values can have one or more channels, e.g. for an RGB image one R-channel, one G-channel and one B-channel, or for a black/white image only one grey-scale or intensity channel. The term "channel" can refer to any "feature", e.g. features obtained from conventional pre-processing or feature extraction or from other neural networks or neural network layers of the neural network 110. The array of input data values can comprise, for instance, two-dimensional RGB or grey scale image or video data representing at least a part of an image, or a one-dimensional audio signal. In case the neural network layer 120 is implemented as an intermediate layer of the neural network 110, the array of input data values can be, for instance, an array of similarity features generated by previous layers of the neural network on the basis of an initial, i.e. original array of input data values, e.g. by means of a feature extraction, as will be described in more detail further below.

As will be described in more detail below, the neural network layer 120 can be implemented as an up-scaling layer 120 configured to process each channel of the array of input data values separately, e.g. for an input array of R-values one (scalar) R-output value is generated. The position dependent kernels may be channel-specific or common for all channels. Moreover, the neural network layer 120 can be implemented as a deconvolution (or deconvolutional) layer configured to "mix" all channels of the array of input data values. For instance, in case the generated array of output data values is an RGB image, i.e. a multi-channel array, every single channel of a multi-channel input data array is used to generate all three channels of the multi-channel array of output data values. The position dependent kernels may be channel-specific, i.e. multi-channel arrays, or common for all channels.

Figure 2:
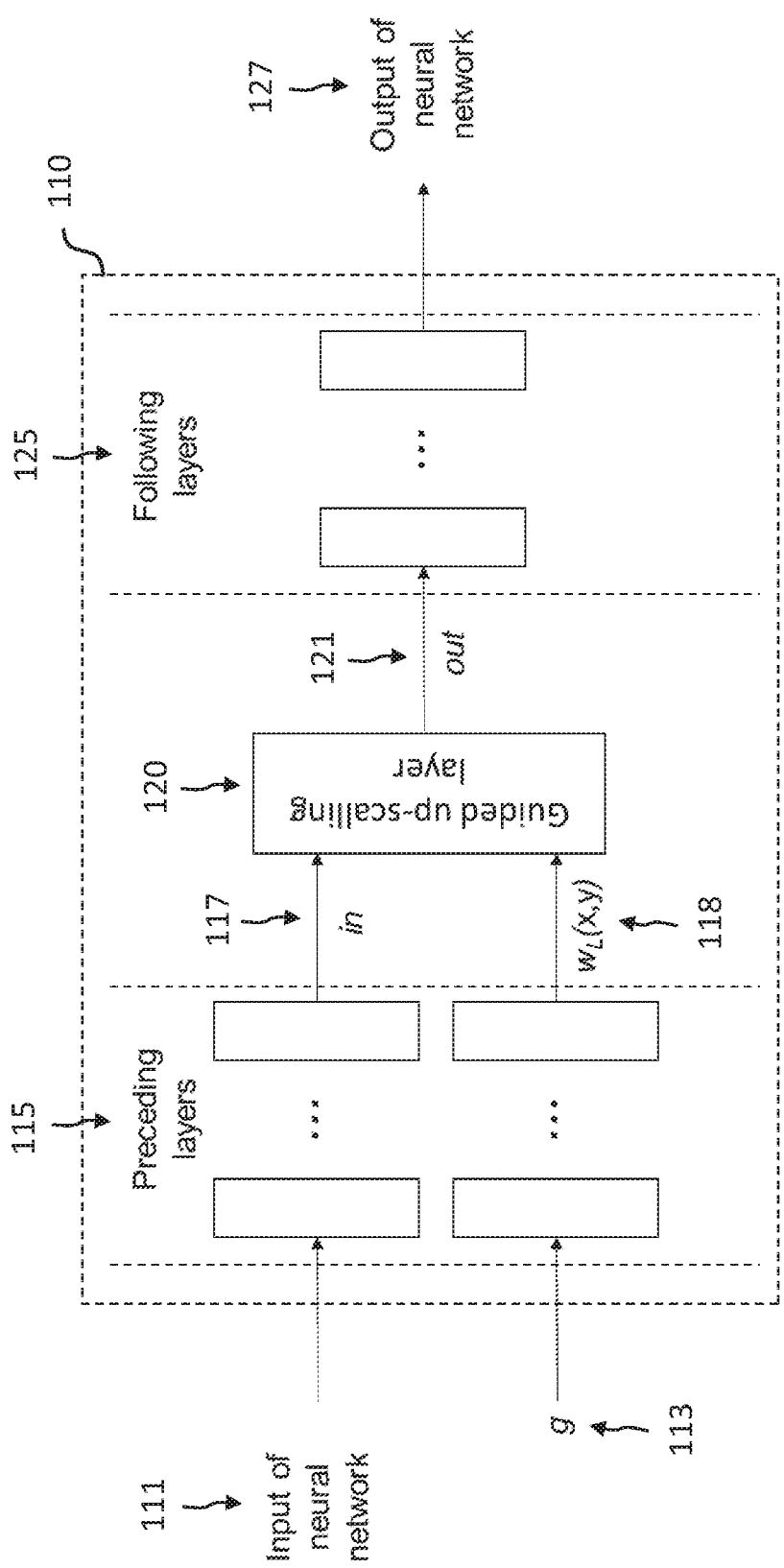
FIG. 2 shows a schematic diagram illustrating a neural network provided by a data processing apparatus according to an embodiment.

FIG. 2 shows a schematic diagram illustrating elements of the neural network 110 provided by the data processing apparatus 100 according to an embodiment. In the embodiment shown in FIG. 2, the neural network layer 120 is implemented as an up-scaling layer 120. In a further embodiment, the neural network layer 120 can be implemented as a deconvolution layer 120 (also referred to as deconvolutional layer 120), as will be described in more detail further below. As indicated in FIG. 2, in this embodiment the up-scaling layer 120 is configured to generate a two-dimensional array of output data values out(x,y) 121 on the basis of the two-dimensional array of input data values in(x,y) 117 and the plurality of position dependent kernels 118 comprising a plurality of kernel values or kernel weights.

In an embodiment, the up-scaling layer 120 of the neural network 110 shown in FIG. 2 is configured to generate the array of output data values out(x,y) 121 on the basis of the array of input data values in(x,y) 117 and the plurality of position dependent kernels 118 comprising the kernel values $w_L(x,y,i,j)$ using the following equations:

$$\text{out}(x, y,) = \frac{1}{W_{L'}(x, y)} \sum_{\{x',y'\}: x'-i=x, y'-j=y} \text{in}(x', y') w_L(x', y', i, j),$$

$$W'_L(x, y) = \sum_{\{x',y'\}: x'-i=x, y'-j=y} w_L(x', y', i, j), i \in \{-r, ..., r\}, j \in \{-r, ..., r\},$$

wherein x,y,x',y',i,j denote array indices, out(x,y) denotes the array of output data values 121, in(x',y') denotes the array of input data values 117, r denotes a size of each kernel of the plurality of position dependent kernels $w_L(x',y',i,j)$ 118 (in this example, each kernel has $(2r+1)*(2r+1)$ kernel values) and $W'_L(x,y)$ denotes a normalization factor and can be set to 1. As will be appreciated, the sum in the equation above extends over every possible position (x',y') of the array of input data values 117, where x' and y' meet the conditions: x'−i=x and y'−j=y. In this way, overlapping positions of different position dependent kernels 118 are obtained that are summed to generate the final output data value out(x,y).

In other embodiments, the normalization factor can be omitted, i.e. set to one. For instance, in case the neural network layer 120 is implemented as a deconvolutional network layer the normalization factor can be omitted. For upscaling the normalization factor allows to keep the DC component. This is usually not required in the case of the deconvolutional network layer 120.

As will be appreciated, the above equations for a two-dimensional input array and a kernel having a quadratic shape can be easily adapted to the case of an array of input values 117 having one dimension or more than two dimensions and/or a kernel having a rectangular shape, i.e. different horizontal and vertical dimensions.

For an embodiment, where the neural network layer 120 is implemented as a deconvolution layer and the array of input data values $\text{in}(x,y,c_i)$ 117 is a two-dimensional array of input data values the deconvolutional layer 120 is configured to generate the array of output data values 121 as a multi-channel array of output data values $\text{out}(x,y,c_o)$ 117, an array having more than one channel $c_o$. In this case, also the plurality of position dependent kernels 118 will have the corresponding number of channels, wherein each multi-channel position dependent kernel comprises the kernel values $w_L(x',y',c_o,c_i,i,j)$. For instance, the deconvolutional layer 120 could be configured to deconvolve a monochromatic image into an RGB image with higher resolution using a plurality of position dependent kernels 118 having three channels.

In an embodiment, the deconvolutional layer 120 is configured to generate the multi-channel array of output data values $\text{out}(x,y,c_o)$ 121 on the basis of the array of input data values $\text{in}(x,y,c_i)$ 117 having one or more channels and the plurality of multi-channel position dependent kernels 118 comprising the kernel values $w_L(x',y',c_o,c_i,i,j)$ using the following equations:

$$\text{out}(x, y, c_o) =$$

$$\frac{1}{W_{L'}(x, y, c_o)} \sum_{c_i=1}^{C_i} \sum_{\{x',y'\}: x'-i=x, y'-j=y} \text{in}(x', y', c_i) w_L(x', y', c_o, c_i, i, j),$$

$$W'_L(x, y, c_o) = \sum_{c_i=1}^{C_i} \sum_{\{x',y'\}: x'-i=x, y'-j=y} w_L(x', y', c_o, c_i, i, j),$$

$$i \in \{-r, ..., r\}, j \in \{-r, ..., r\},$$

wherein x,y,x',y',i,j denote array indices, r denotes a size of each kernel of the plurality of position dependent kernels 118 and $W_{L'}(x,y,c_o)$ denotes a normalization factor. In other embodiments, the normalization factor can be omitted, i.e. set to one.

Figure 3:
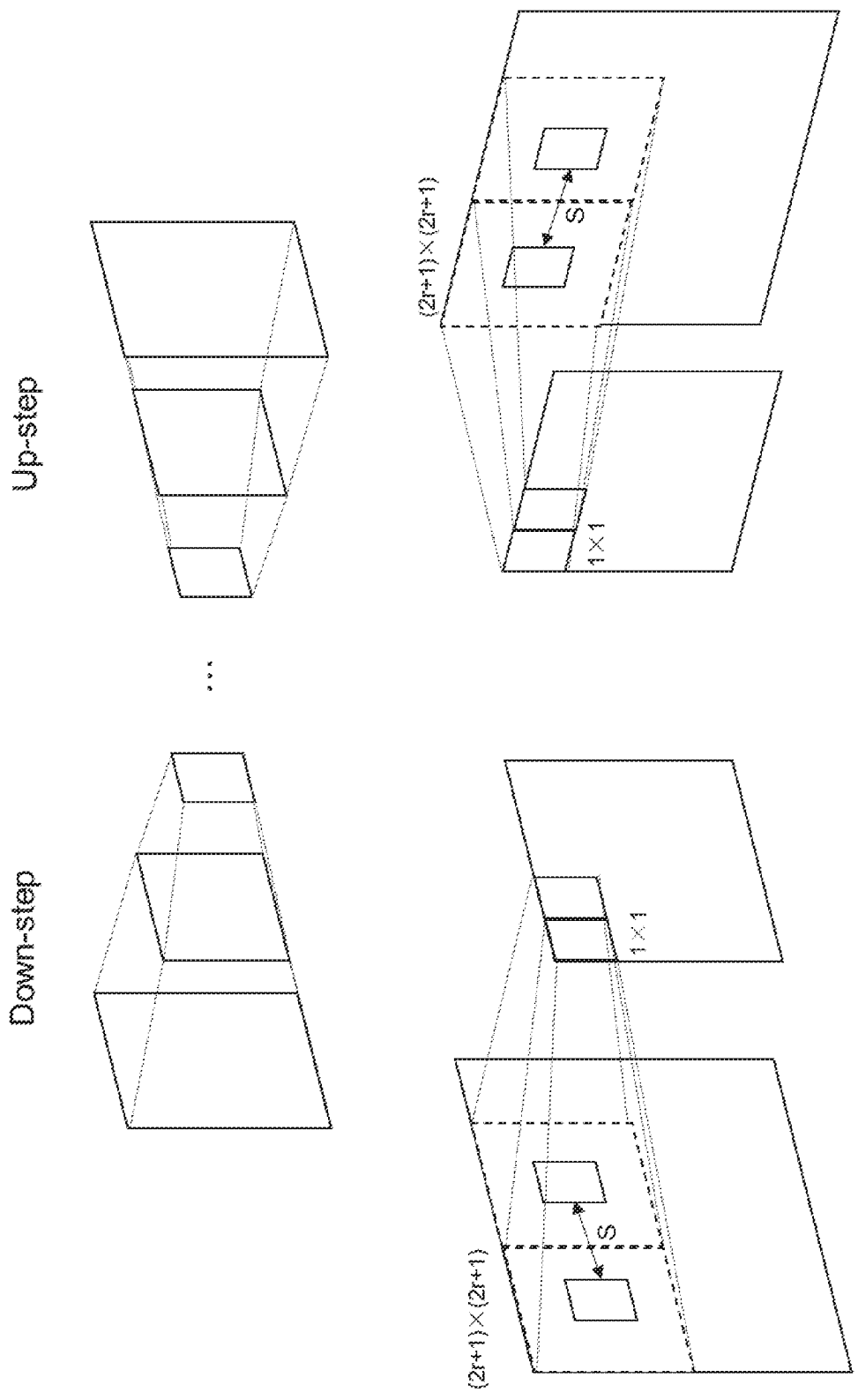
FIG. 3 shows a schematic diagram illustrating the concept of up-scaling of data implemented in a data processing apparatus according to an embodiment.

In an embodiment, the neural network layer 120 is configured to generate the array of output data values 121 with a larger size than the array of input data values 117. In other words, in an embodiment, the neural network 110 is configured to perform an up-step or upscaling operation of the array of input data values 117 on the basis of the plurality of position dependent kernels 118. FIG. 3 illustrates an up-step or upscaling operation provided by a neural network 110 of the data processing apparatus 100 according to an embodiment. Using an up-step or upscaling operation allows increasing the receptive field, enables processing the data with a cascade of smaller filters as compared with a single layer with a kernel covering an equal receptive field, and also enables the neural network 110 to better analyse the data by finding more sophisticated relationships among the data.

In the up-step or upscaling operation illustrated in FIG. 3 the neural network layer 120 can up-scale the input data produced by a preceding cascade of down-layers for generating an array of output data values having an increased resolution. This upscaling operation can be performed by deconvolving every channel of each spatial position of the array of input data values with position dependent kernels with a stride S greater than 1, producing a data volume of increased resolution. The stride S specifies the spacing between neighboring input spatial positions for which deconvolutions are computed. If the stride S is equal to 1, the deconvolution is performed for each spatial position. If the stride S is an integer greater than 1, deconvolution is performed for every S spatial position, increasing the output resolution by a factor of S for each spatial dimension.

In the exemplary embodiment shown in FIG. 3, the neural network layer 120 up-scales every element of the array of input data values 117 into a respective sub-array of the array of output data values 121 with a size of $(2r+1)\times(2r+1)$ (defined by the size of the position dependent kernels 118). In this way, the input data values 117 can be up-scaled to the higher resolution array of output data values 121.

Figure 4:
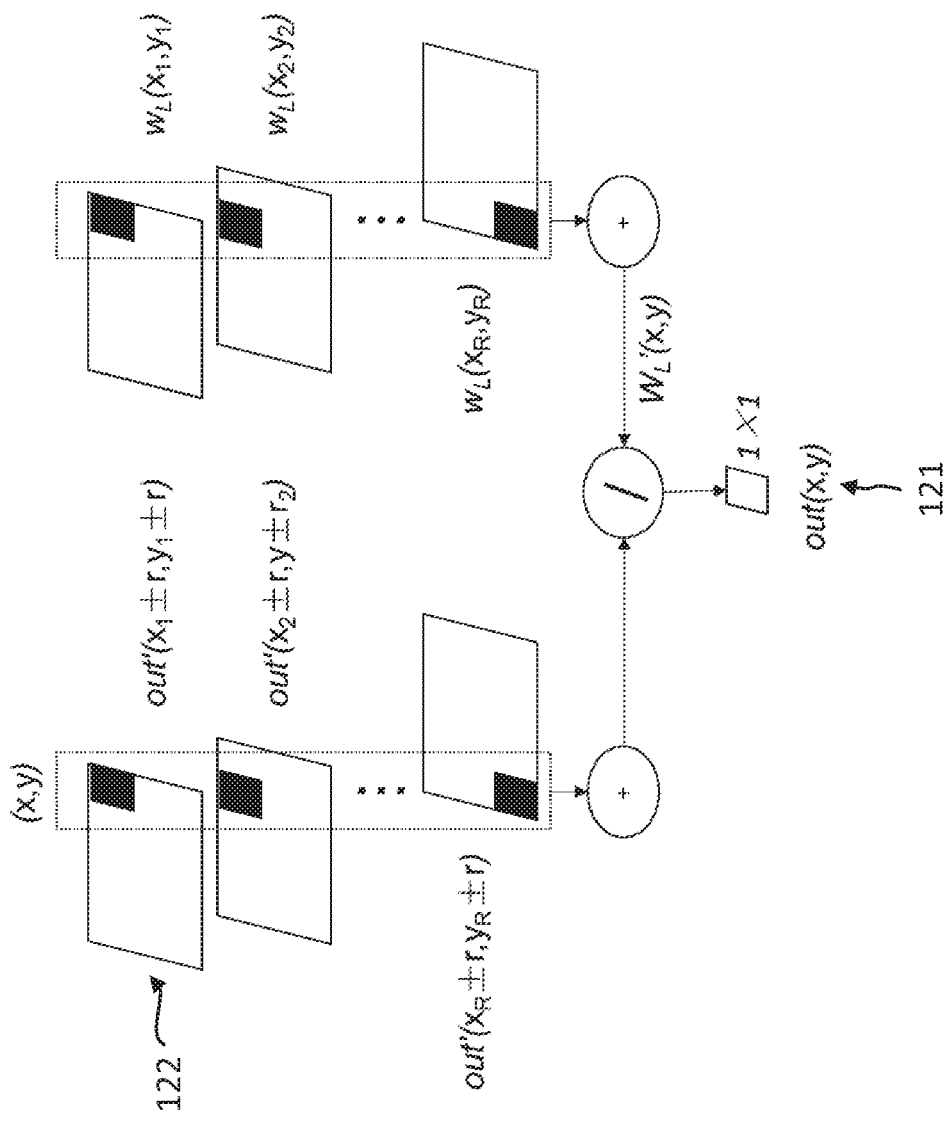
FIG. 4 shows a schematic diagram illustrating an up-scaling operation provided by a neural network of a data processing apparatus according to an embodiment.

According to an embodiment, the upscaling operation performed by the neural network layer 120 for the exemplary case of two-dimensional input and output arrays 117, 121 comprises multiplying a respective input data value of the array of input data values 117 with the plurality of kernel weights $w_L(x,y,i,j)$ of a respective position dependent kernel 118. In case the respective position dependent kernel 118 has an exemplary size of $(2r+1)\times(2r+1)$ this operation will generate a sub-array of the array of output data values 121 (which can also be considered as an interpolation area) having also a size of $(2r+1)\times(2r+1)$. As will be appreciated, depending on the selected stride S, the interpolation areas of neighboring input data values may overlap. In order to handle such case, according to an embodiment, the values from all overlapping interpolation areas 122 located at the spatial position (x,y) (i.e. overlapping spatial position) can be aggregated and (optionally) normalized by a normalization factor producing the final output data value out(x,y). This operation is illustrated in FIG. 4 for the exemplary case of having R sub-arrays or interpolation areas at the spatial position (x,y).

In the embodiment shown in FIG. 2, the neural network 110 comprises one or more preceding layers 115 preceding the neural network layer 120 and one or more following layers 125 following the neural network layer 120. In an embodiment, the neural network layer 120 could be the first and/or the last data processing layer of the neural network 110, i.e. in an embodiment there could be no preceding layers 115 and/or no following layers 125.

In an embodiment, the one or more preceding layers 115 can be further neural network layers, such as a convolutional network layer, and/or "conventional" pre-processing layers, such as a feature extraction layer. Likewise, in an embodiment, the one or more following layers 125 can be further neural network layers and/or "conventional" post-processing layers.

As shown in the embodiment shown in FIG. 2, one or more of the preceding layers 115 can be configured to provide, i.e. to generate the plurality of position dependent kernels 118. In an embodiment, the one or more layers of the preceding layers 115 can generate the plurality of position dependent kernels 118 on the basis of an original array of original input data values. As indicated in FIG. 2, in an embodiment, the original array of original input data values can be an array of input data 111 being the original input of the neural network 110. In another embodiment, the one or more preceding layers 115 could be configured to generate just the plurality of position dependent kernels 118 on the basis of the original input data 111 of the neural network 110 and to provide the original input data 111 of the neural network 110 as the array of input data values 117 to the neural network layer 120.

Figure 5:
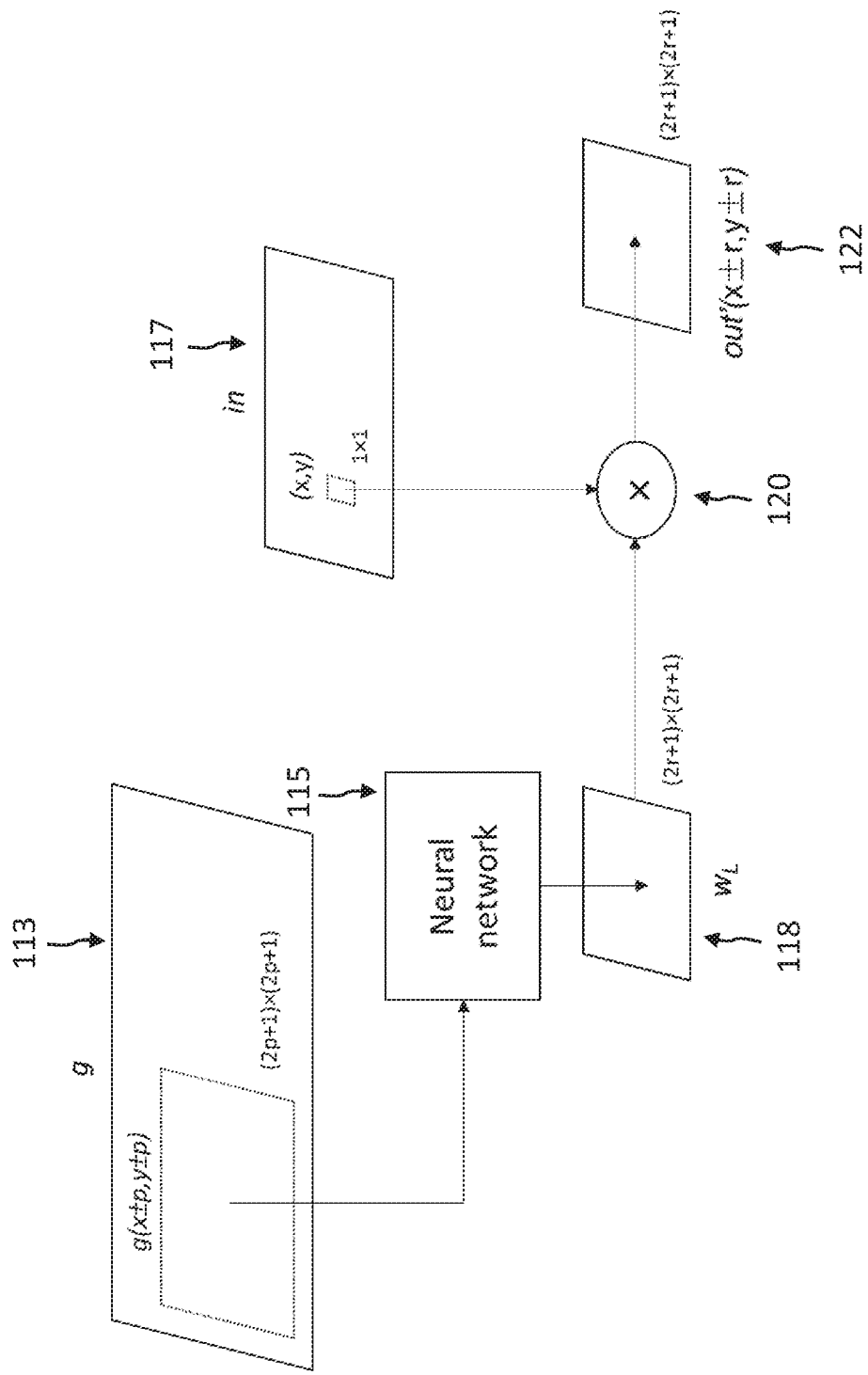
FIG. 5 shows a schematic diagram illustrating different aspects of a neural network provided by a data processing apparatus according to an embodiment.

As indicated in FIG. 2, in a further embodiment, the one or more preceding layers 115 of the neural network 110 are configured to generate the plurality of position dependent kernels 118 on the basis of an array of guiding data 113. A more detailed view of the processing operations of the neural network 110 of the data processing apparatus 100 according to such an embodiment is shown in FIG. 5 for the exemplary case of two-dimensional input and output arrays. The array of guiding data 113 is used by the one or more preceding layers 115 of the neural network 110 to generate the plurality of position dependent kernels $w_L(x,y)$ 118 on the basis of the array of guiding data g(x,y) 113. As already described in the context of FIG. 2, the neural network layer 120 is configured to generate the two-dimensional array of output data values out(x,y) 121 on the basis of the two-dimensional array of input data values in(x,y) 117 and the plurality of position dependent kernels $w_L(x,y)$ 118, which, in turn, are based on the array of guiding data g(x,y) 113.

In an embodiment, the one or more preceding layers 115 of the neural network 110 are neural network layers configured to learn the plurality of position dependent kernels $w_L(x,y)$ 118 on the basis of the array of guiding data g(x,y) 113. In another embodiment, the one or more preceding layers 115 of the neural network 110 are pre-processing layers configured to generate the plurality of position dependent kernels $w_L(x,y)$ 118 on the basis of the array of guiding data 113 using one or more pre-processing schemes, such as feature extraction.

Figure 6:
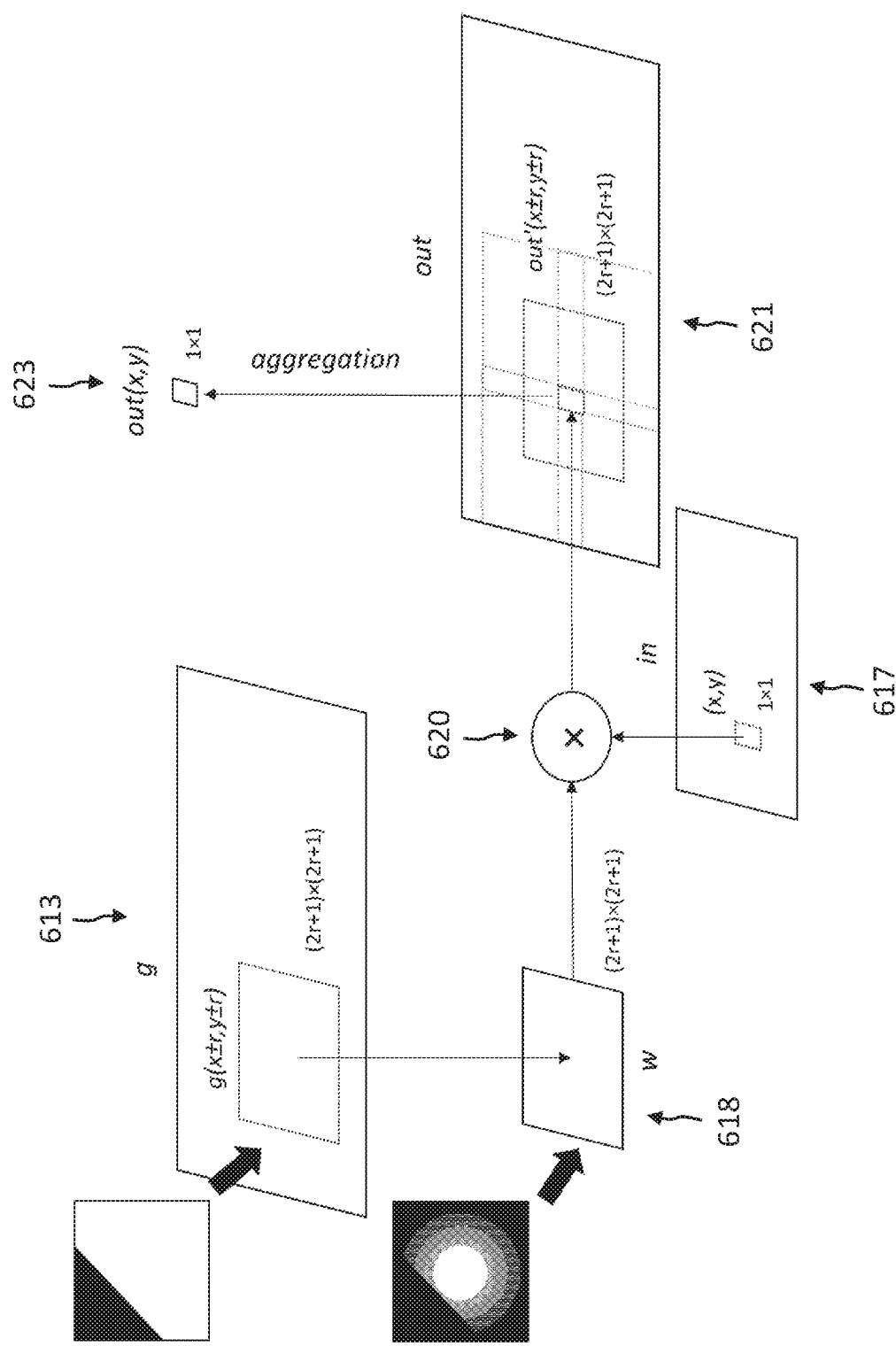
FIG. 6 shows a schematic diagram illustrating different aspects of a neural network provided by a data processing apparatus according to an embodiment.

In an embodiment, the one or more preceding layers 115 of the neural network 110 are configured to generate the plurality of position dependent kernels $w_L(x,y)$ 118 on the basis of the array of guiding data g(x,y) 113 in a way analogous to up-scaling based on bilateral filters, as illustrated in FIG. 6. In image processing, a common approach to perform data up-scaling is to use bilateral filter weights [M. Elad, "On the origin of bilateral filter and ways to improve it", IEEE Transactions on Image Processing, vol. 11, no. 10, pp. 1141-1151, October 2002] as a sort of guiding information for interpolating the input data. The usage of bilateral filter weights has the advantage of decreasing the influence of input data values on some spatial positions of the interpolation results, while amplifying its influence for others. As illustrated in FIG. 6, the weights 618 utilized for up-scaling the array of input data values 617 adapt to input data using the guiding image data g 613 which provides additional information to control the up-scaling process. In the up-scaling process, a single input data value of the array of input data values in(x,y) 617 is multiplied by the kernel w 618 of size (2r+1)×(2r+1) creating an interpolated area of output data out(x±r,y±r) 521 of size (2r+1)×(2r+1). As will be appreciated, however, the interpolation areas of neighbouring input positions may overlap. In order to handle such cases, values from different overlapping interpolation areas located at the spatial position x, y can be aggregated and normalized by a normalization factor W'(x,y) producing the final output value out(x,y). If the stride S is greater than 1, the spatial resolution of the output data created by the interpolation areas will be increased. Mathematically, this can be expressed in the following way:

$$\text{out}(x, y) = \frac{1}{W'(x, y)} \sum_{\{x',y'\}:x'-i=x,y'-j=y} \text{in}(x', y')w(x', y', i, j)$$

where:

$W'(x,y) = E_{\{x',y'\}:x'-i=x,y'-j=y} w(x',y',i,j)$, $i \in \{r, \ldots, r\}, j \in \{r, \ldots, r\}$.

In an embodiment, the bilateral filter weights 618 are defined by the following equation:

$$w(x, y, i, j) = e^{-\frac{(x-i)^2+(y-j)^2}{2w_r}} e^{-\frac{d(g(x-i,y-j),g(x,y))}{2w_d}},$$

wherein d(•,•) denotes a distance function. Thus, the bilateral filter weights 618 can take into account the distance of the value within the kernel from the center of the kernel and, additionally, the similarity of the data values with data in the center of the kernel.

Figure 7:
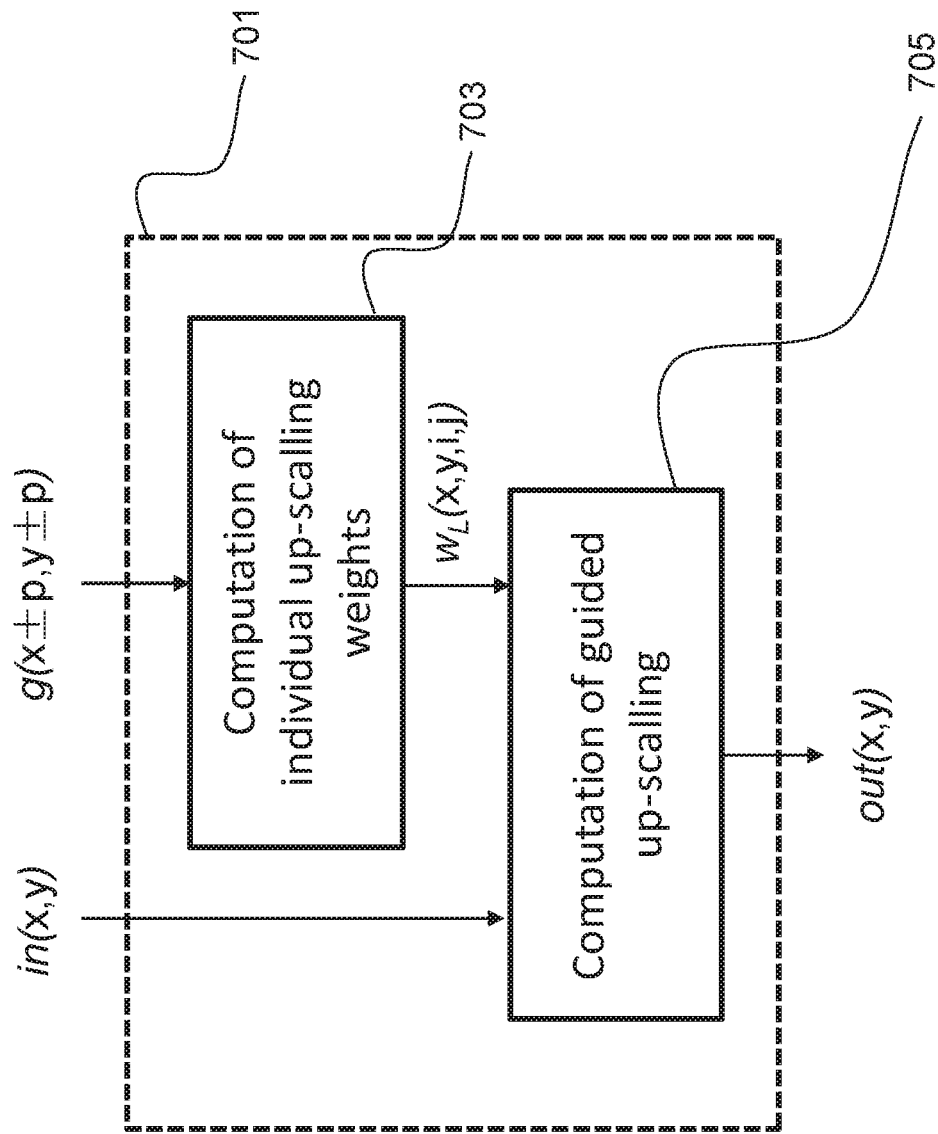
FIG. 7 shows a schematic diagram illustrating different processing operation s of a data processing apparatus according to an embodiment.

FIG. 7 shows a schematic diagram highlighting the main processing stage 701 of the data processing apparatus 100 according to an embodiment, for instance, the data processing apparatus 100 providing the neural network 110 shown in FIG. 2. As already described above, in a first processing operation 703 the neural network 110 can generate the plurality of position dependent kernels $w_L(x,y)$ 118 on the basis of the array of guiding data g(x,y) 113. In a second processing operation 705 the neural network 110 can generate the array of output data values out (x,y) 121 on the basis of the array of input data values in(x,y) 117 and the plurality of position dependent kernels $w_L(x,y,i,j)$ 118.

Figure 8:
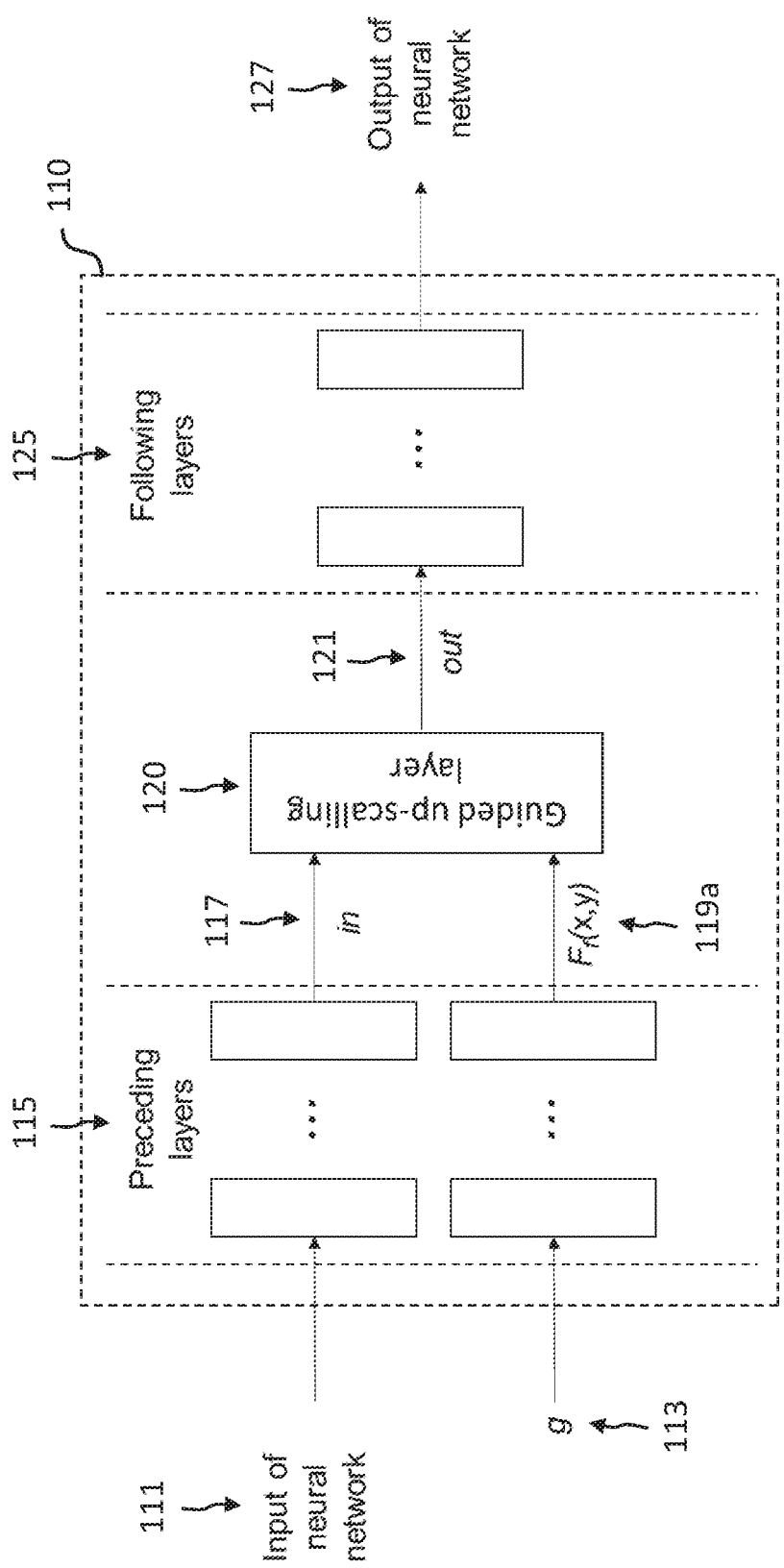
FIG. 8 shows a schematic diagram illustrating a neural network provided by a data processing apparatus according to an embodiment.

FIG. 8 shows a schematic diagram illustrating the neural network 110 provided by the data processing apparatus 100 according to a further embodiment. As will be described in more detail in the following, the main difference to the embodiment shown in FIG. 2 is that in the embodiment shown in FIG. 8 the neural network 110 is configured to generate the plurality of position dependent kernels based on a plurality of position independent kernels 119b (shown in FIG. 9) and a plurality of position dependent weights $F_j(x,y)$ 119a (also referred to as similarity features 119a). In an embodiment, the similarity features 119a could indicate higher-level knowledge about the input data, including e.g. semantic segmentation, per-instance object detection, data importance indicators like ROI (Region of Interest) and many others all learned by the neural network 110 itself or being an additional input to the neural network 110. In an embodiment, the neural network 110 of FIG. 8 is configured to generate the plurality of position dependent kernels 118 by adding the position independent kernels 119b weighted by the associated position dependent weights $F_r(x,y)$ 119a.

In an embodiment, the plurality of position independent kernels 119b can be predetermined or learned by the neural network 110. As illustrated in FIG. 8, also in this embodiment the neural network 110 can comprise one or more preceding layers 115, which precede the neural network layer 120 and which can be implemented as an additional neural network layer or a pre-processing layer. In an embodiment, one or more layers of the preceding layers 115 are configured to generate the plurality of position dependent weights $F_f(x,y)$ 119a on the basis of an original array of original input data values. The original array of original input data values of the neural network 110 can comprise the array of input data values 117 to be processed by the neural network layer 120 or another array of input data values 111 associated to the array of input data values 117, for instance, the initial array of input data 111.

Figure 9:
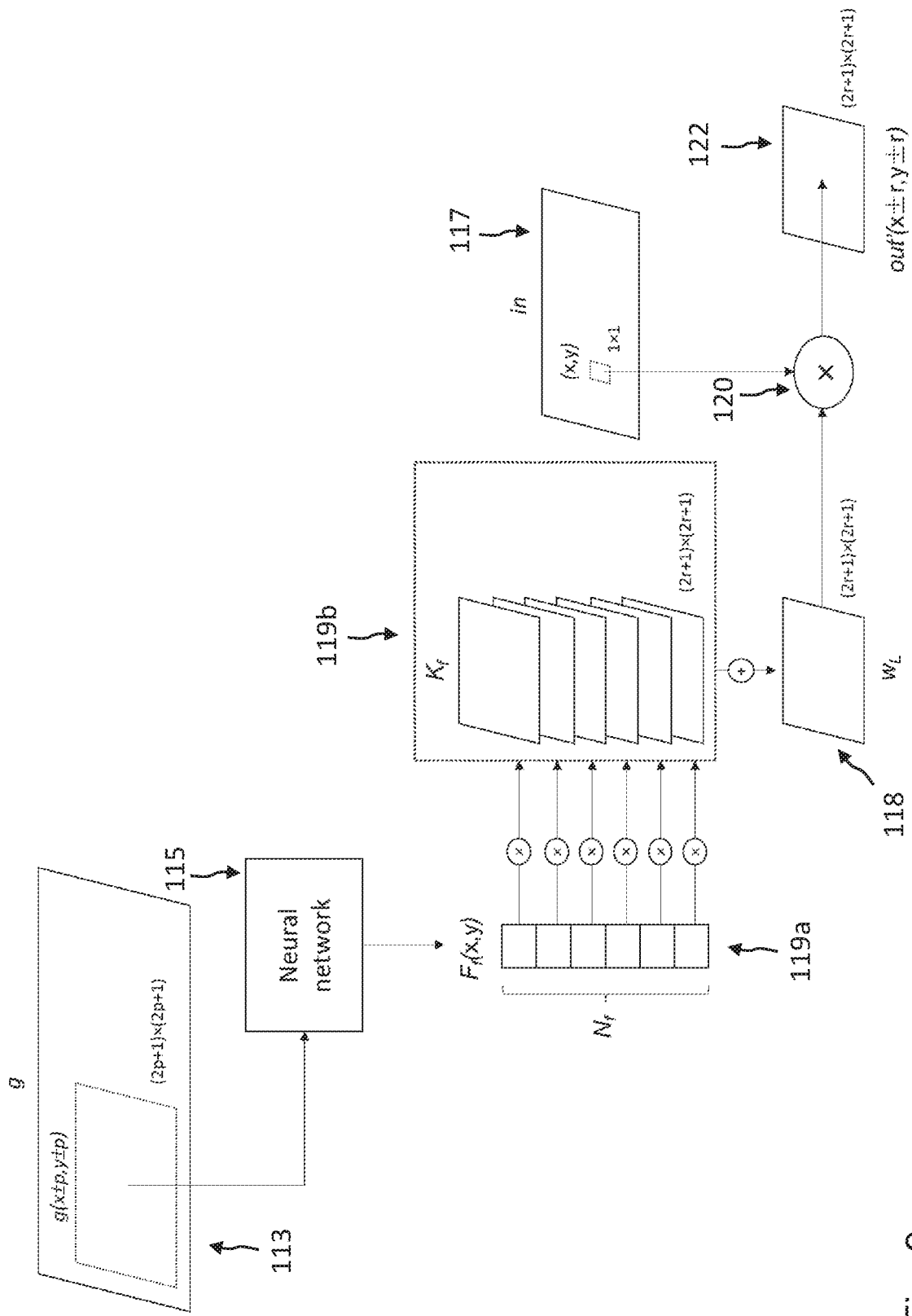
FIG. 9 shows a schematic diagram illustrating different aspects of a neural network provided by a data processing apparatus according to an embodiment.

In the exemplary embodiment shown in FIG. 8, the array of input data values in(x,y) 117 and the array of output data values out(x,y) 121 are two-dimensional arrays and the neural network layer 120 is configured to generate a respective kernel of the plurality of position dependent kernels $w_L(x,y,i,j)$ 118 on the basis of the following equation:

$$w_L(x,y,i,j) = \Sigma_{f=1}^{N_f} F_f(x,y) \cdot K_f(i,j),$$

wherein $F_f(x,y)$ denotes the set of $N_f$ position dependent weights (or similarity features) 119a and $K_f(i,j)$ denotes the plurality of position independent kernels 119b, as also illustrated in FIG. 9.

Figure 10:
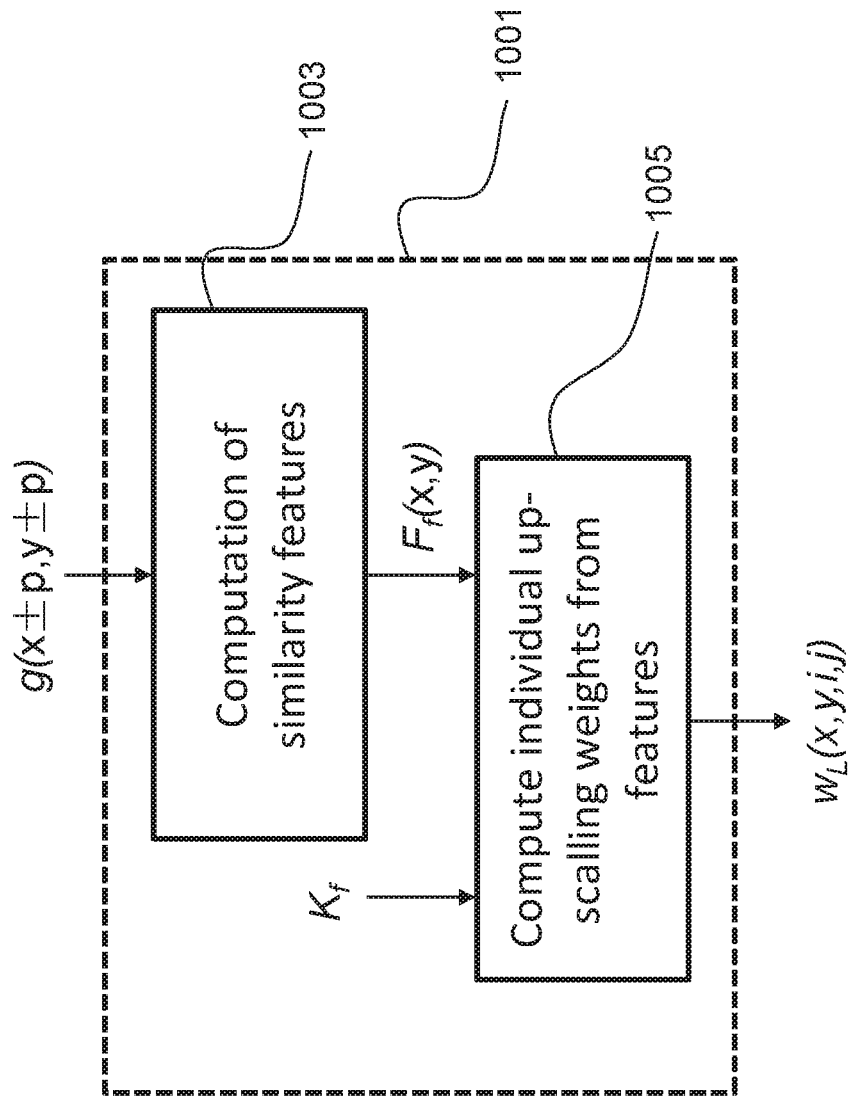
FIG. 10 shows a schematic diagram illustrating different processing operations of a data processing apparatus according to an embodiment.

FIG. 10 shows a schematic diagram highlighting the main processing stage 1001 implemented in the data processing apparatus 100 according to an embodiment, for instance, the data processing apparatus 100 providing the neural network 100 illustrated in FIGS. 8 and 9. As already described above, in a first processing operation 1003 the neural network 110 can generate the plurality of position dependent weights or similarity features $F_f(x,y)$ 119a on the basis of the array of guiding data g(x,y) 113. In a second processing step 1005 the neural network 110 can generate the plurality of position dependent kernels $w_L(x,y,i,j)$ 118 on the basis of the plurality of position dependent weights or similarity features $F_f(x,y)$ 119a and the plurality of position independent kernels $K_f(i,j)$ 119b. In a further operation (not shown in FIG. 10, but similar to the processing operation 705 shown in FIG. 7) the neural network layer 120 can generate the array of output data values out(x,y) 121 on the basis of the array of input data values in(x,y) 117 and the plurality of position dependent kernels $w_L(x,y,i,j)$ 118.

In a further embodiment, the neural network layer 120 is configured to process the array of input data values 117 on the basis of the plurality of position dependent kernels 118 using an "inverse" maximum or minimum pooling scheme. In one embodiment, the array of input data values 117 and the array of output data values 121 are two-dimensional arrays and the neural network layer 120 is configured to generate the array of output data values 121 on the basis of the following equations:

$$\text{out}(x, y) = \frac{1}{W_{L'}(x, y)} \sum_{\{x',y'\}: x'-i=x, y'-j=y} \text{in}(x', y') \text{sel}(x', y', i, j),$$

$$W_{L'}(x, y) = \sum_{\{x',y'\}: x'-i=x, y'-j=y} \text{sel}(x', y', i, j),$$

$$i \in \{-r, \ldots, r\}, j \in \{-r, \ldots, r\},$$

$$\text{sel}(x, y, i, j) =$$
$$\begin{cases} 1, & w_L(x, y, i, j) \text{ is max or min weight of all } w_L(x, y, k, l), \\ & k \in \{-r, \ldots, r\}, l \in \{-r, \ldots, r\} \\ 0, & \text{otherwise} \end{cases}$$

wherein x,y,x',y',i,j,k,l denote array indices, out(x,y) denotes the array of output data values 121, in(x',y') denotes the array of input data values 117, r denotes a size of each kernel of the plurality of position dependent kernels $w_L(x,y,i,j)$ 118, sel(x,y,i,j) denotes a selection function and $W_{L'}(x,y)$ denotes a normalization factor. In an embodiment, the normalization factor $W_{L'}(x,y)$ can be set equal to 1.

In this embodiment, the neural network layer 120 can be considered to adaptively guide data from the array of input data values 117 to a spatial position of a sub-array of the array of output data values 121 (i.e. the interpolated area) based on the individual position dependent kernel values 118. In this way a sort of more intelligent data un-pooling can be performed. In an embodiment, the input data value corresponding to the spatial position (x,y) is copied to the position $(x-i_{max/min}, y-j_{max/min})$ of the sub-array of output data values (i.e. the interpolated area) of size $(2r+1)\times(2r+1)$, where $(i_{max/min}, j_{max/min})$ are the indices of the individual kernel values with the largest (max) or slowest (min) value among all individual kernel values. As can be taken from the equations above, in this embodiment, other values can be set to zero or, in an alternative embodiment, remain unset. Additionally, an aggregation of overlapping sub-arrays, i.e. interpolated areas can be performed, as in the embodiments described above.

In another embodiment, the array of input data values 117 and the array of output data values 121 are two-dimensional arrays and the neural network layer 120 is configured to generate the array of output data values 121 on the basis of the following equations:

$$\text{out}(x, y) = \frac{1}{W_{L'}(x, y)} \sum_{\{x',y'\}: x'-i=x, y'-j=y} \text{in}(x', y') \text{sel}(x, y, x', y', i, j),$$

$$W_{L'}(x, y) = \sum_{\{x',y'\}: x'-i=x, y'-j=y} \text{sel}(x, y, x', y', i, j),$$

$$i \in \{-r, \ldots, r\}, j \in \{-r, \ldots, r\},$$

$$\text{sel}(x, y, x', y', i, j) =$$
$$\begin{cases} 1, & w_L(x', y', i, j) \text{ is maximum weight of all } w_L(x'', y'', k, l), \\ & \{x'', y''\}: x'' - k = x, y'' - l = y, \\ & k \in \{-r, \ldots, r\}, l \in \{-r, \ldots, r\} \\ 0, & \text{otherwise} \end{cases}$$

wherein x,y,x',y',x'',y'',j,k,l denote array indices, out(x,y) denotes the array of output data values 121, in(x',y') denotes the array of input data values 117, r denotes a size of each kernel of the plurality of position dependent kernels $w_L(x',y',i,j)$ 118, sel(x,y,x',y',i,j) denotes a selection function and $W_L'(x,y)$ denotes a normalization factor. In an embodiment the normalization factor $W_L'(x,y)$ can be set equal to 1.

In this embodiment, the neural network layer 120 can be considered to adaptively select output data out(x,y) from input data guided into position (x,y) without performing a weighted average, but selecting as the output data value out(x,y) the input data value in(x',y') of the array of input data values 117 which corresponds to the maximum or minimum kernel value $w_L(x',y',i,j)$. As a result, the output is computed as the input data value which would originally contribute the most (or in the alternative embodiment the least) to the weighted average.

Figure 11:
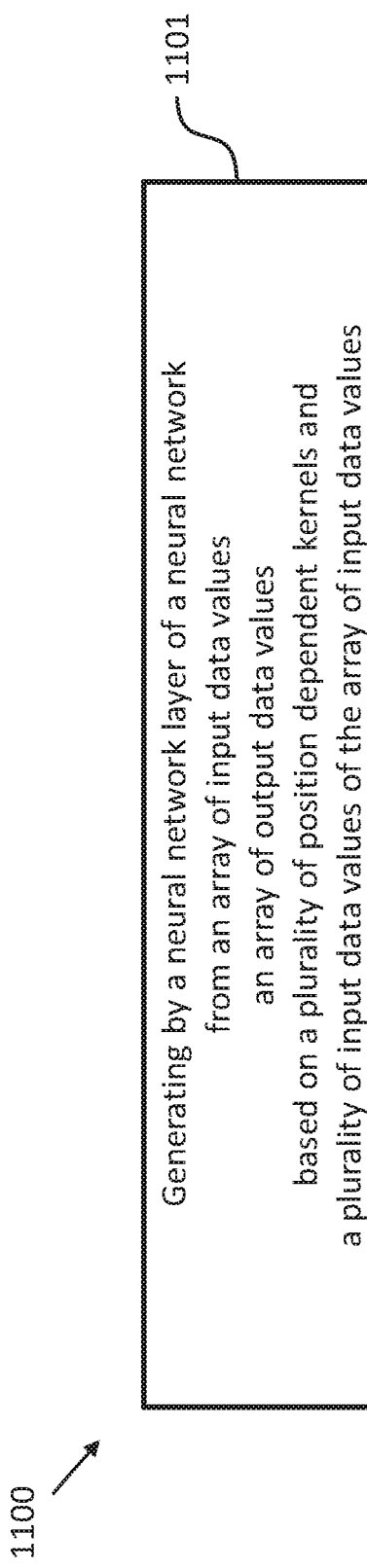
FIG. 11 shows a flow diagram illustrating a neural network data processing method according to an embodiment.

FIG. 11 shows a flow diagram illustrating a data processing method 1100 based on a neural network 110 according to an embodiment. The data processing method 1100 can be performed by the data processing apparatus 100 shown in FIG. 1 and its different embodiments described above. The data processing method 1100 comprises the operation 1101 of generating by the neural network layer 120 of the neural network 110 from the array of input data values 117 the array of output data values 121 based on a plurality of position dependent kernels 118 and a plurality of input data values of the array of input data values 117. As will be appreciated, further embodiments of the data processing method 1100 result directly from the embodiments of the corresponding data processing apparatus 100 described above. Embodiments of the data processing methods may be implemented and/or performed by one or more processors as described above.

In the following some further details about various aspects and embodiments (aggregation network layer, convolution network layer, correlation network layer and normalization) are provided.

Upscaling

In embodiments the proposed guided aggregation can be applied for feature map up-scaling (spatial resolution increase). Input values which are features of the feature map are up-scaled one-by-one forming overlapping output subarrays of values which are than aggregated and optionally normalized to form output data array. Due to additional guiding information in form of position dependent kernels, the up-scaling process for each input value can be performed in a controlled way, enabling addition of higher resolution details, e.g. object or region borders, that was originally not present in the input low-resolution representation. Here, guiding data represents information about object or region borders in higher resolution, and can be obtained by e.g. color-based segmentation, semantic segmentation using preceding neural network layers or an edge map of a texture image corresponding to processed feature map.

Deconvolution

In embodiments the proposed guided deconvolution can be applied for switchable feature extraction or mixing. Input values which are features of the feature map are deconvolved with adaptable filters which are formed from the input guiding data in form of position dependent kernels. This way, each selected area of the input feature map can be processed with filters especially adapted for that area producing and mixing only features desired for these regions. Here, guiding data in form of similarity features represents information about object/region borders, obtained by e.g. color-based segmentation, semantic segmentation using preceding neural network layers, an edge map of a texture image corresponding to processed feature map or a ROI (region of interest) binary map.

Normalization

In general, normalization is advantageous if the output values obtained for different spatial positions are going to be compared to each other per-value, without any intermediate operation. As a result, preservation of the mean (DC) component is beneficial. If such comparison is not performed, normalization is not required but increases complexity. Additionally, one can omit normalization in order to simplify the computations and compute only an approximate result.

While a particular feature or aspect of the disclosure may have been disclosed with respect to only one of several implementations or embodiments, such feature or aspect may be combined with one or more other features or aspects of the other implementations or embodiments as may be desired and advantageous for any given or particular application. Furthermore, to the extent that the terms "include", "have", "with", or other variants thereof are used in either the detailed description or the claims, such terms are intended to be inclusive in a manner similar to the term "comprise". Also, the terms "exemplary", "for example" and "e.g." are merely meant as an example, rather than the best or optimal. The terms "coupled" and "connected", along with derivatives may have been used. It should be understood that these terms may have been used to indicate that two elements cooperate or interact with each other regardless whether they are in direct physical or electrical contact, or they are not in direct contact with each other.

Although aspects have been illustrated and described herein, it will be appreciated by those of ordinary skill in the art that a variety of alternate and/or equivalent implementations may be substituted for the aspects shown and described without departing from the scope of the present disclosure. This application is intended to cover any adaptations or variations of the aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

Many alternatives, modifications, and variations will be apparent to those skilled in the art in light of the above teachings. Of course, those skilled in the art readily recognize that there are numerous applications of the invention beyond those described herein. While the embodiments of the invention have been described with reference to one or more particular embodiments, those skilled in the art recognize that many changes may be made thereto without departing from the scope of the invention. It is therefore to be understood that within the scope of the appended claims and their equivalents, the embodiments of the invention may be practiced otherwise than as described herein.

The invention claimed is:

1. A data processing apparatus comprising:
a processor configured to:
provide a neural network, wherein the neural network comprises a neural network layer configured to generate from an array of input data values and an array of output data values based on a plurality of position dependent kernels and a plurality of input data values of the array of input data values, wherein the neural network comprises an additional neural network layer configured to generate the plurality of position dependent kernels based on an original array of original input data values of the neural network, wherein the original array of original input data values of the neural network comprises the array of input data values or another array of input data values associated to the array of input data values, wherein the array of input data values and the array of output data values are two-dimensional arrays and wherein the neural network layer includes an upscaling network layer configured to generate the array of output data values on the basis of the following equations:
basis $$\text{out}(x, y) = \frac{1}{W_{L'}(x, y)} \sum_{\{x',y'\}:x'-i=x,y'-j=y} \text{in}(x', y') w_L(x', y', i, j),$$

$$W_{L'}(x, y) = \sum_{\{x',y'\}:x'-i=x,y'-j=y} w_L(x', y', i, j) \text{ or } W'_L(x, y) = 1,$$

$$i \in \{-r, \ldots, r\}, j \in \{-r, \ldots, r\},$$

wherein x, y, x', y', i, j denote array indices, out(x, y) denotes the array of output data values, in(x', y') denotes the array of input data values, r denotes a size of each kernel of the plurality of position dependent kernels $w_L(x', y', i, j)$ and $W_L'(x, y)$ denotes a normalization factor.

2. The data processing apparatus of claim 1, wherein the neural network is configured to generate the plurality of position dependent kernels based on a plurality of position independent kernels and a plurality of position dependent weights.

3. The data processing apparatus of claim 2, wherein the neural network is configured to generate a kernel of the plurality of position dependent kernels by adding the position independent kernels weighted by the associated position dependent weights.

4. The data processing apparatus of claim 2, wherein the plurality of position independent kernels are predetermined or learned and wherein the neural network comprises the additional neural network layer or a processing layer configured to generate the plurality of position dependent weights based on the original array of original input data values of the neural network, wherein the original array of original input data values of the neural network comprises the array of input data values or another array of input data values associated to the array of input data values.

5. The data processing apparatus of claim 2, wherein the array of input data values and the array of output data values are two-dimensional arrays and the neural network layer is configured to generate a kernel of the plurality of position dependent kernels $W_L$, (x, y, i, j) on the basis of the following equation:

$$w_L(x, y, i, j) = \sum_{f=1}^{N_f} F_f(x, y) \cdot K_f(i, j),$$

wherein $F_f$ (x, y) denotes the plurality of $N_f$ position dependent weights and $K_f(i, j)$ denotes the plurality of position independent kernels.

6. The data processing apparatus of claim 1, wherein the neural network layer is a deconvolutional network layer.

7. The data processing apparatus of claim 1, wherein the array of input data values and the array of output data values are two-dimensional arrays and wherein the neural network layer is a deconvolution network layer configured to generate the array of output data values on the basis of the following equations:

$$\text{out}(x, y, c_o) = \frac{1}{W_{L'}(x, y, c_o)} \sum_{c_i=1}^{C_i} \sum_{\{x',y'\}:x'-i=x,y'-j=y} \text{in}(x', y', c_i) w_L(x', y', c_o, c_i, i, j),$$

$$W'_L(x, y, c_o) = \sum_{c_i=1}^{C_i} \sum_{\{x',y'\}:x'-i=x,y'-j=y} w_L(x', y', c_o, c_i, i, j) \text{ or }$$

$$W'_L(x, y, c_o) = 1,$$

$$i \in \{-r, \ldots, r\}, j \in \{-r, \ldots, r\}.$$

wherein x, y, x', y', i, j denote array indices, out(x, y, $c_o$) denotes the array of output data values having one or more channels, in(x', y', $c_i$) denotes the array of input data values, r denotes a size of each kernel of the plurality of position dependent kernels $W_L(x',y', c_o, c_i, i, j)$ having one or more channels and $W_L'(x, y, c_o)$ denotes a normalization factor.

8. The data processing apparatus of claim 1, wherein the neural network layer is configured to generate the array of output data values on the basis of overlapping interpolation areas, wherein each overlapping interpolation area is generated on the basis of the input data value of the array of input data values and the respective kernel of the plurality of position dependent kernels by assigning to the overlapping interpolation area the input data value of the array of input data values at a position corresponding to a position of a maximum or minimum value of the respective kernel of the plurality of position dependent kernels and zero otherwise.

9. The data processing apparatus of claim 1, wherein the array of input data values and the array of output data values are two-dimensional arrays and the neural network layer is configured to generate the array of output data values on the basis of the following equations:

$$\text{out}(x, y) = \frac{1}{W_{L'}(x, y)} \sum_{\{x',y'\}:x'-i=x,y'-j=y} \text{in}(x', y') \text{sel}(x', y', i, j),$$

$$W_{L'}(x, y) = \sum_{\{x',y'\}:x'-i=x,y'-j=y} \text{sel}(x', y', i, j) \text{ or } W'_L(x, y) = 1,$$

$$i \in \{-r, \ldots, r\}, j \in \{-r, \ldots, r\},$$

$$\text{sel}(x, y, i, j) = \begin{cases} 1, w_L(x, y, i, j) \text{ is max or min weight of all } w_L(x, y, k, l), \\ \quad k \in \{-r, \ldots, r\}, l \in \{-r, \ldots, r\} \\ 0, \text{ otherwise} \end{cases}$$

wherein x, y, x',y', i, j, k, l denote array indices, out(x, y) denotes the array of output data values, in(x', y') denotes the array of input data values, r denotes a size of each kernel of the plurality of position dependent kernels $w_L$ (x, y, i, j) (118), sel(x, y, i, j) denotes a selection function and $W_L'(x, y)$ denotes a normalization factor.

10. The data processing apparatus of claim 1, wherein the neural network layer is configured to generate the array of output data values, wherein each value of the array of output data values at an overlapping spatial position is generated on the basis of the input data values of the array of input data values for which values of the respective kernels of the plurality of position dependent kernels at the overlapping spatial position are a maximum or minimum value among all the values of the respective kernels of the plurality of position dependent kernels at the overlapping spatial position.

11. The data processing apparatus of claim 1, wherein the array of input data values and the array of output data values are two-dimensional arrays and the neural network layer is configured to generate the array of output data values on the basis of the following equations:

$$\text{out}(x, y) = \frac{1}{W'_{L'}(x, y)} \sum_{\{x',y'\}: x'-i=x, y'-j=y} \text{in}(x', y')\text{sel}(x, y, x', y', i, j),$$

$$W'_L(x, y) = \sum_{\{x',y'\}: x'-i=x, y'-j=y} \text{sel}(x, y, x', y', i, j) \text{ or } W'_L(x, y) = 1,$$

$$i \in \{-r, \ldots, r\}, j \in \{-r, \ldots, r\},$$

$$\text{sel}(x, y, x', y', i, j) =$$

$$\begin{cases} 1, w_L(x', y', i, j) \text{ is maximum weight of all } w_L(x'', y'', k, l), \\ \{x'', y''\}: x'' - k = x, y'' - l = y, \\ k \in \{-r, \ldots, r\}, l \in \{-r, \ldots, r\} \\ 0, \text{otherwise} \end{cases}$$

wherein x, y, x', y', x", y", i, j, k, l denote array indices, out(x, y) denotes the array of output data values, in(x', y') denotes the array of input data values, r denotes a size of each kernel of the plurality of position dependent kernels $w_L$(x', y', i, j) 118, sel(x, y, x', y', i, j) denotes a selection function and $W_L'$(x, y) denotes a normalization factor.

12. A data processing method comprising:
generating by a neural network layer of a neural network from an array of input data values and an array of output data values based on a plurality of position dependent kernels and a plurality of different input data values of the array of input data values, wherein the neural network comprises an additional neural network layer configured to generate the plurality of position dependent kernels based on an original array of original input data values of the neural network, wherein the original array of original input data values of the neural network comprises the array of input data values or another array of input data values associated to the array of input data values, wherein the array of input data values and the array of output data values are two-dimensional arrays and wherein the neural network layer includes an upscaling network layer configured to generate the array of output data values on the basis of the following equations:

$$\text{out}(x, y) = \frac{1}{W_{L'}(x,y)} \sum_{\{x',y'\}: x'-i=x, y'-j=y} \text{in}(x', y')w_L(x', y', i, j),$$

$$W'_L(x, y) = \sum_{\{x',y'\}: x'-i=x, y'-j=y} w_L(x', y', i, j) \text{ or } W'_L(x, y) = 1,$$

$$i \in \{-r, \ldots, r\}, j \in \{-r, \ldots, r\},$$

wherein x, y, x', y', i, j denote array indices, out(x, y) denotes the array of output data values, in(x', y') denotes the array of input data values, r denotes a size of each kernel of the plurality of position dependent kernels $w_L$(x', y', i, j) and $W_L'$(x, y) denotes a normalization factor.

13. The method of claim 12, wherein the neural network is configured to generate the plurality of position dependent kernels based on a plurality of position independent kernels and a plurality of position dependent weights.

14. The method of claim 13, wherein the neural network is configured to generate a kernel of the plurality of position dependent kernels by adding the position independent kernels weighted by the associated position dependent weights.

15. The method of claim 13, wherein the plurality of position independent kernels are predetermined or learned and wherein the neural network comprises the additional neural network layer or a processing layer configured to generate the plurality of position dependent weights based on the original array of original input data values of the neural network, wherein the original array of original input data values of the neural network comprises the array of input data values or another array of input data values associated to the array of input data values.

16. The method of claim 13, wherein the array of input data values and the array of output data values are two-dimensional arrays and the neural network layer is configured to generate a kernel of the plurality of position dependent kernels $w_L$(x, y, i, j) on the basis of the following equation:

$$w_L(x, y, i, j) = \sum_{f=1}^{N_f} F_f(x, y) \cdot K_f(i, j),$$

wherein $F_f$ (x, y) denotes the plurality of $N_f$ position dependent weights and $K_f$(i,j) denotes the plurality of position independent kernels.

17. A non-transitory computer-readable medium comprising program code stored therein, which when executed by a processor, causes the processor to perform operations comprising:
generating by a neural network layer of a neural network from an array of input data values and an array of output data values based on a plurality of position dependent kernels and a plurality of different input data values of the array of input data values, wherein the neural network comprises an additional neural network layer configured to generate the plurality of position dependent kernels based on an original array of original input data values of the neural network, wherein the original array of original input data values of the neural network comprises the array of input data values or another array of input data values associated to the array of input data values, wherein the array of input data values and the array of output data values are two-dimensional arrays and wherein the neural network layer includes an upscaling network layer configured to generate the array of output data values on the basis of the following equations:

$$\text{out}(x, y) = \frac{1}{W_{L'}(x,y)} \sum_{\{x',y'\}: x'-i=x, y'-j=y} \text{in}(x', y')w_L(x', y', i, j),$$

$$W'_L(x, y) = \sum_{\{x',y'\}: x'-i=x, y'-j=y} w_L(x', y', i, j) \text{ or } W'_L(x, y) = 1,$$

$$i \in \{-r, \ldots, r\}, j \in \{-r, \ldots, r\},$$

wherein x, y, x', y', i, j denote array indices, out (x, y) denotes the array of output data values, in(x', y') denotes the array of input data values, r denotes a size of each kernel of the plurality of position dependent kernels $w_L(x', y', i, j)$ and $W_L'(x, y)$ denotes a normalization factor.

18. The computer-readable medium of claim 17, wherein the neural network is configured to generate the plurality of position dependent kernels based on a plurality of position independent kernels and a plurality of position dependent weights.

19. The computer-readable medium of claim 18, wherein the neural network is configured to generate a kernel of the plurality of position dependent kernels by adding the position independent kernels weighted by the associated position dependent weights.

20. The computer-readable medium of claim 18, wherein the plurality of position independent kernels are predetermined or learned and wherein the neural network comprises the additional neural network layer or a processing layer configured to generate the plurality of position dependent weights based on the original array of original input data values of the neural network, wherein the original array of original input data values of the neural network comprises the array of input data values or another array of input data values associated to the array of input data values.

21. The computer-readable medium of claim 18, wherein the array of input data values and the array of output data values are two-dimensional arrays and the neural network layer is configured to generate a kernel of the plurality of position dependent kernels $W_L(x, y, i, j)$ on the basis of the following equation:

$$w_L(x, y, i, j) = \sum_{f=1}^{N_f} F_f(x, y) \cdot K_f(i, j),$$

wherein $F_f(x, y)$ denotes the plurality of $N_f$ position dependent weights and $K_f(i, j)$ denotes the plurality of position independent kernels.

* * * * *

UNITED STATES PATENT AND TRADEMARK OFFICE
CERTIFICATE OF CORRECTION

PATENT NO. : 11,687,775 B2
APPLICATION NO. : 16/579665
DATED : June 27, 2023
INVENTOR(S) : Jacek Konieczny Page 1 of 4

It is certified that error appears in the above-identified patent and that said Letters Patent is hereby corrected as shown below:

In the Claims

In Claim 1, Column 19, Line 11-18, delete $$\text{out}(x, y) = \frac{1}{W_{L'}(x, y)} \sum_{\{x',y'\}: x'-i=x, y'-j=y} \text{in}(x', y') w_L(x', y', i, j),$$

$$W_{L'}(x, y) = \sum_{\{x',y'\}: x'-i=x, y'-j=y} w_L(x', y', i, j) \text{ or } W'_L(x, y) = 1,$$

"$i \in \{-r, \ldots, r\}, j \in \{-r, \ldots, r\},$" and $$\text{out}(x, y) = \frac{1}{W_{L'}(x,y)} \sum_{\{x',y'\}: x'-i=x, y'-j=y} \text{in}(x', y') w_L(x', y', i, j),$$

$$W_L'(x, y) = \sum_{\{x',y'\}: x'-i=x, y'-j=y} w_L(x', y', i, j) \text{ or } W'_L(x, y) = 1,$$

insert -- $i \in \{-r, \ldots, r\}, j \in \{-r, \ldots, r\},$ --.

Signed and Sealed this
Seventeenth Day of October, 2023

Katherine Kelly Vidal
*Director of the United States Patent and Trademark Office*

CERTIFICATE OF CORRECTION (continued)
U.S. Pat. No. 11,687,775 B2

In Claim 7, Column 20, Line 3-12, delete

"$$out(x, y, c_o) = \frac{1}{W'_{L'}(x, y, c_o)} \sum_{c_i=1}^{C_i} \sum_{\{x',y'\}: x'-i=x, y'-j=y} in(x', y', c_i)w_L(x', y', c_o, c_i, i, j),$$

$$W'_L(x, y, c_o) = \sum_{c_i=1}^{C_i} \sum_{\{x',y'\}: x'-i=x, y'-j=y} w_L(x', y', c_o, c_i, i, j) \text{ or}$$

$$W'_L(x, y, c_o) = 1,$$

$$i \in \{-r, \ldots, r\}, j \in \{-r, \ldots, r\}.$$" and insert --
$$out(x,y,c_o) = \frac{1}{W'_{L'}(x,y,c_o)} \sum_{c_i=1}^{C_i} \sum_{\{x',y'\}: x'-i=x, y'-j=y} in(x',y',c_i)w_L(x',y',c_o,c_i,i,j),$$

$$W'_L(x,y,c_o) = \sum_{c_i=1}^{C_i} \sum_{\{x',y'\}: x'-i=x, y'-j=y} w_L(x',y',c_o,c_i,i,j) \text{ or } W'_L(x,y,c_o) = 1,$$

$$i \in \{-r,\ldots,r\}, j \in \{-r,\ldots,r\},$$ --.

In Claim 9, Column 20, Line 40-47, delete

"$$out(x, y) = \frac{1}{W'_{L'}(x, y)} \sum_{\{x',y'\}: x'-i=x, y'-j=y} in(x', y')sel(x', y', i, j),$$

$$W'_{L'}(x, y) = \sum_{\{x',y'\}: x'-i=x, y'-j=y} sel(x', y', i, j) \text{ or } W'_L(x, y) = 1,$$

$$i \in \{-r, \ldots, r\}, j \in \{-r, \ldots, r\},$$"

and insert --
$$out(x,y) = \frac{1}{W'_{L'}(x,y)} \sum_{\{x',y'\}: x'-i=x, y'-j=y} in(x',y')sel(x',y',i,j),$$

$$W'_L(x,y) = \sum_{\{x',y'\}: x'-i=x, y'-j=y} sel(x',y',i,j) \text{ or } W'_L(x,y) = 1,$$

$$i \in \{-r,\ldots,r\}, j \in \{-r,\ldots,r\},$$ --.

In Claim 11, Column 21, Line 11-18, delete

"$$\text{out}(x, y) = \frac{1}{W_{L'}(x, y)} \sum_{\{x', y'\}: x'-i=x, y'-j=y} \text{in}(x', y') sel(x, y, x', y', i, j),$$

$$W'_L(x, y) = \sum_{\{x', y'\}: x'-i=x, y'-j=y} sel(x, y, x', y', i, j) \text{ or } W'_L(x, y) = 1,$$

$$i \in \{-r, \ldots, r\}, j \in \{-r, \ldots, r\},$$"

and insert --

$$out(x,y) = \frac{1}{W_{L'}(x,y)} \sum_{\{x',y'\}: x'-i=x, y'-j=y} in(x',y') sel(x,y,x',y',i,j),$$

$$W_L'(x,y) = \sum_{\{x',y'\}: x'-i=x, y'-j=y} sel(x,y,x',y',i,j) \text{ or } W_L'(x,y) = 1,$$

$$i \in \{-r, \ldots, r\}, j \in \{-r, \ldots, r\},$$

--.

In Claim 12, Column 21, Line 54-59, delete

"$$\text{out}(x, y) = \frac{1}{W_{L'}(x,y)} \sum_{\{x', y'\}: x'-i=x, y'-j=y} \text{in}(x', y') w_L(x', y', i, j),$$

$$W'_L(x, y) = \sum_{\{x', y'\}: x'-i=x, y'-j=y} w_L(x', y', i, j) \text{ or } W'_L(x, y) = 1,$$

$$i \in \{-r, \ldots, r\}, j \in \{-r, \ldots, r\},$$"

and insert --

$$out(x,y) = \frac{1}{W_{L'}(x,y)} \sum_{\{x',y'\}: x'-i=x, y'-j=y} in(x',y') w_L(x',y',i,j),$$

$$W_L'(x,y) = \sum_{\{x',y'\}: x'-i=x, y'-j=y} w_L(x',y',i,j) \text{ or } W_L'(x,y) = 1,$$

$$i \in \{-r, \ldots, r\}, j \in \{-r, \ldots, r\},$$

--.

CERTIFICATE OF CORRECTION (continued)
U.S. Pat. No. 11,687,775 B2

In Claim 17, Column 22, Line 60-65, delete

" $$\text{out}(x, y) = \frac{1}{W'_L(x,y)} \sum_{\{x',y'\}:\, x'-i=x, y'-j=y} \text{in}(x', y') w_L(x', y', i, j),$$

$$W'_L(x, y) = \sum_{\{x',y'\}:\, x'-i=x, y'-j=y} w_L(x', y', i, j) \text{ or } W'_L(x, y) = 1,$$

$$i \in \{-r, \ldots, r\}, j \in \{-r, \ldots, r\},$$

" and insert

-- $$\text{out}(x, y) = \frac{1}{W'_L(x,y)} \sum_{\{x',y'\}:\, x'-i=x, y'-j=y} \text{in}(x', y') w_L(x', y', i, j),$$

$$W'_L(x, y) = \sum_{\{x',y'\}:\, x'-i=x, y'-j=y} w_L(x', y', i, j) \text{ or } W'_L(x, y) = 1,$$

$$i \in \{-r, \ldots, r\}, j \in \{-r, \ldots, r\},$$

--.